United States Patent [19]

Betensky et al.

[11] Patent Number: 4,828,372

[45] Date of Patent: May 9, 1989

[54] WIDE-ANGLE ZOOM LENS

[75] Inventors: Ellis I. Betensky, Redding, Conn.;
Melvyn H. Kreitzer, Cincinnati, Ohio

[73] Assignee: Eastman Kodak Company,
Rochester, N.Y.

[21] Appl. No.: 161,070

[22] Filed: Feb. 26, 1988

Related U.S. Application Data

[63] Continuation-in-part of Ser. No. 107,223, Oct. 9, 1987.

[51] Int. Cl.$^4$ .................. G02B 15/177; G02B 9/64
[52] U.S. Cl. .................................. 350/427; 350/426
[58] Field of Search .................. 350/427, 432, 426

[56] References Cited

U.S. PATENT DOCUMENTS

| | | | |
|---|---|---|---|
| 4,304,466 | 12/1981 | Betensky | 350/426 |
| 4,586,793 | 5/1986 | Tanaka et al. | 350/426 |
| 4,607,918 | 8/1986 | Ogata | 350/426 |
| 4,726,667 | 2/1988 | Tachihara | 350/426 |

FOREIGN PATENT DOCUMENTS

0222806 12/1984 Japan .
0068311 4/1985 Japan .

*Primary Examiner*—Bruce Y. Arnold
*Assistant Examiner*—Rebecca D. Gass
*Attorney, Agent, or Firm*—John B. Turner

[57] ABSTRACT

A compact wide-angle zoom lens with short back focus comprises a forwardmost negative power lens unit movable for focusing and compensation during zooming, followed by a positive power variator lens unit comprising a forward positive power lens sub-unit movable for zooming and a rearward lens sub-unit also movable for zooming.

30 Claims, 14 Drawing Sheets

WIDE-ANGLE ZOOM LENS

This is a continuation-in-part of our earlier filed application Ser. No. 107,223 entitled ZOOM LENS, filed Oct. 9, 1987.

CROSS-REFERENCE TO RELATED APPLICATIONS

Reference is made to commonly assigned copending U.S. patent application Ser. No. 107,139, now Pat. No. 4,757,372, filed Oct. 9, 1987, entitled SLR ZOOM CAMERA commonly assigned allowed U.S. patent application Ser. No. 072,945, now Pat. No. 4,756,609 filed July 13, 1987 entitled FOUR COMPONENT COMPACT ZOOM LENS and to copending U.S. patent application Ser. No. 076,893 filed July 23, 1987 entitled ZOOM LENS WITH SHORT BACK FOCAL LENGTH.

BACKGROUND OF THE INVENTION

1. Field of the Invention

This invention relates to wide-angle zoom lenses, and more particularly to zoom taking lenses for photographic cameras.

2. Description Relative to the Prior Art

It has long been known to make two unit zoom lenses with a negative front focusing and compensating lens unit followed by a positive variator lens unit. Traditionally, in the case of both zoom lens design and fixed focal length lens design, negative front lens element units are used for wide angle applications. This is because the off-axis ray angles are reduced immediately on entry to the lens, reducing the aberration contributions of the lens elements following the negative front lens element unit. In the case of a long focal length lens, there is no such requirement, and because the use of a negative front lens element unit typically results in a longer-than-normal front-vertex-to-image distance, its other advantages have not offset the disadvantages. The use of such two unit zoom lenses has generally been limited to relatively small zoom ranges ratios, usually less than 2.5:1. This is partially because a moving lens element unit having a change of magnification of approximately 3:1 generally has a large change of aberration due to conjugate change, which of course, depends upon the aperture and field.

To increase the zoom range, it has also been known to make the variator unit in the form of a variable triplet type lens unit with variable spacing within that unit, to thereby provide the additional aberration compensation required by the additional change in magnification. This approach, however, further increases the overall length of the lens, making it undesirably long, particularly in the case of relatively large zoom ratios.

U.S. Pat. No. 4,304,466 discloses that a zoom lens with a negative front lens element unit can have a relatively long focal length, i.e. a maximum field angle of less than 45° and a zoom ratio extending beyond 3:1, while at the same time being quite compact, thus taking advantage of the relative simplicity afforded by the negative front lens element unit design while avoiding the long length normally associated with that type of construction. To achieve these objectives, the foregoing patent specifies that the negative front lens element unit is a biconcave negative lens element and that the variator lens unit, which has overall positive power, is divided into first and second sub-units. The division of the variator unit provides for additional aberration compensation, and, if the second sub-unit has significant optical power, to also provide additional magnification change.

While in general it is ideal to equally divide the optical "work" of magnification change among the available lens units, the above identified patent discloses that a long focal length zoom lens of the type having a negative front unit; and an overall positive variator unit, comprising first and second sub-units, can have relatively few lens elements and no aspherical surfaces if the first lens sub-unit provides the majority of the magnification change. This is because that sub-unit must of necessity be of strong optical power, being the positive real image forming lens unit. It thus requires relatively small movement of the sub-units to achieve the desired magnification change, which in turn reduces the change of off-axis aberrations while zooming. The required aberration correction can be thus provided by an all-spherical second lens sub-unit.

For long focal length zoom lenses, the total front vertex-to-image distance must be minimized for ease of use. The foregoing patent discloses that this can be accomplished by use of a relatively strong negative power lens assemblage for the second variator sub-unit. Additionally, this second variator sub-unit is spaced from the first, positive lens sub-unit in order to provide aberration correction for the off-axis imagery, particularly of those aberrations due to changes introduced by zooming. In order to provide sufficient off-axis aberration correction, it is necessary to provide substantial separation between the two sub-units of the variator unit; the result being that the first principal point of the overall variator unit is located in front of its forward vertex, as disclosed in U.S. Pat. No. 4,304,466 which also contributes to the compactness of the lens.

The above-mentioned copending U.S. patent application Ser. No. 076,893 discloses various short focal length zoom lenses of the general type described above but in which aspherical surfaces are used in the variator unit to correct aberrations. In all of the disclosed short focal length lenses the majority of the magnification change during zooming is provided by the negative power variator lens element sub-unit. As in the case of the disclosure of the previously mentioned U.S. Pat. No. 4,304,466, a biconcave negative power element is employed in the first negative power lens unit in all of the examples having negative-positive-negative configuration with the latter two components comprising the variator lens element unit.

SUMMARY OF THE INVENTION

The present invention is based on the discovery that the general type of zoom lens described above, i.e. a zoom lens having a negative power front unit and a positive power variator unit comprising two spaced sub-units, can be adapted to provide wide-angle field coverage, i.e. to have an effective minimum focal length shorter than the image diagonal, and, in many versions, to provide macro focus capability, i.e. an object to image size ratio of less than 4:1 at the long focal length condition, both such objectives being achievable without necessarily resorting to aspheric elements, or to complex spherical lens element units, and without sacrificing the compactness and optical simplicity advantages of that type of lens. Additionally, the invention makes it possible for the first lens element unit to be relatively simple, inexpensive and compact, and thus there is no need to consider complex mechanisms often associated with rear focusing systems used in auto-focus cameras because of difficulties involved in focusing a large and heavy unit.

From an analysis of the disclosure of the above cited U.S. Pat. No. 4,304,466 and U.S. Pat. application Ser. No. 076,893, it is evident that the optical performance, particularly distortion, of systems of the foregoing type disclosed therein, will deteriorate rapidly if the angular coverage is increased, particularly if no aspheric elements are used. Also, while the first lens element unit in those disclosures has sufficient optical power to provide close focusing, the change of astigmatism due to close focusing with a field of view larger than about forty-five degrees is too large to be considered for use in a macro-focus application. Accordingly, neither those disclosures nor any modification of those constructions according to previously known lens design optimization computer programs suggests that this general type of zoom lens could be utilized to provide wide angle field coverage, particularly in conjunction with macro-focusing. Because both astigmatism and distortion vary as a function of the square and higher powers of angular field coverage, such an approach would be counter-intuitive in a zoom lens design of this type.

Briefly, the invention makes it possible to realize the foregoing objectives in a zoom lens of the type having a negative power focusing and compensating lens element unit followed by a positive power variator lens element unit comprising first and second sub-units, by employing various novel features directed to the configuration and arrangement of the optical elements comprising the first and second lens element units and of the sub-units of the latter. The manner in which one or more of such features is employed in a particular lens is dependent on various design requirements, among which the zoom range and zoom range ratio are of great significance. Of such foregoing novel unit and sub-unit configuration features, the most consequential are: including in the first focusing and compensating lens element unit at least two negative power lens elements to increase both the power and the aberration correction of that lens unit; providing a positive power first variator lens element sub-unit with a plurality of mutually adjacent positive power lens elements followed by at least one negative power lens element at the rear of that sub-unit to minimize size and reduce complexity; and making the second variator lens element sub-unit of negative power with at least one positive power lens element forwardly of at least one negative power lens element to provide correction for color, astigmatism and power with a minimum number of elements.

In the case of a wide angle zoom lens with a low zoom ratio, e.g. 2.5:1 or less, storage length is most critical, and the use of negative power for the second sub-unit is not necessary. Accordingly, the residual aberration changes introduced by the first units can be reduced effectively if a weak lens-unit of either positive or negative power is used. This allows such a lens to be very compact. For example, the optical components of a 2:1 zoom range ratio lens for a 35 mm camera, such as a 35–70 millimeter focal length zoom lens, can fit in a collapsed storage space of only 55 millimeters if a second lens sub-unit of very weak positive power is employed, even if the change of magnification of that unit, by itself, is minimal.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

First Illustrative Embodiment

Figure 1:
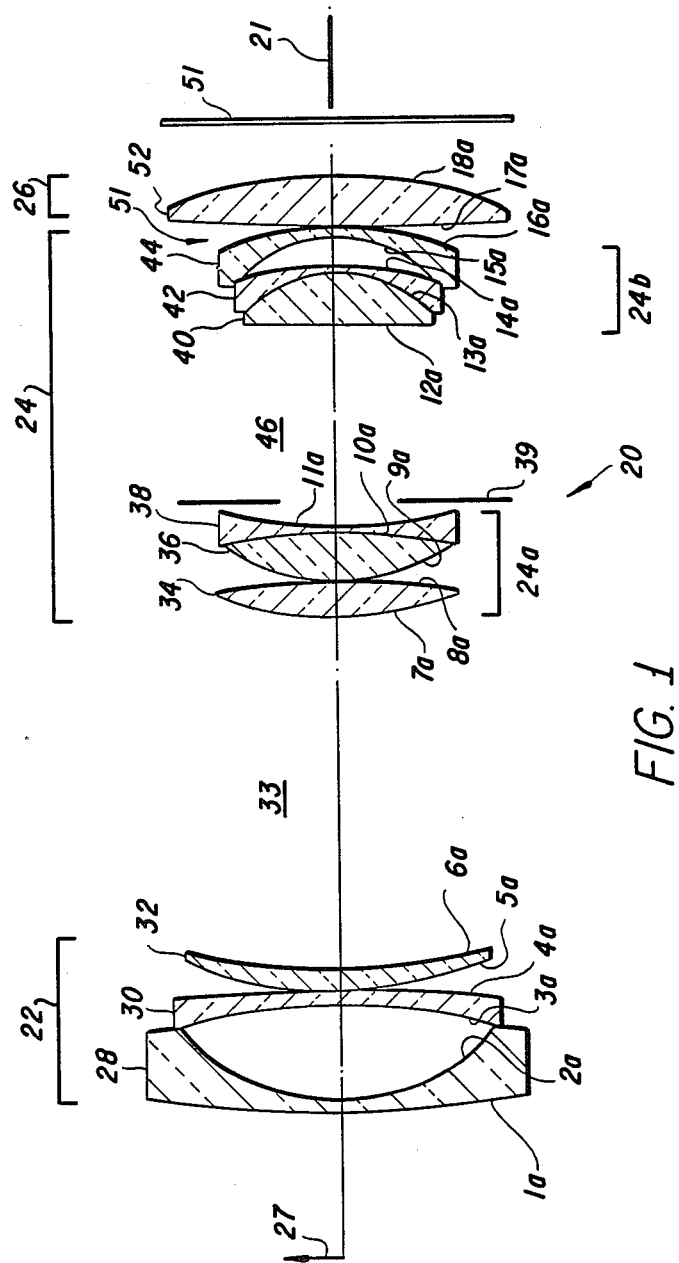
FIG. 1 is a diagram of a first embodiment of a lens in accordance with the present invention, in a short focal length condition.
Figure 2:
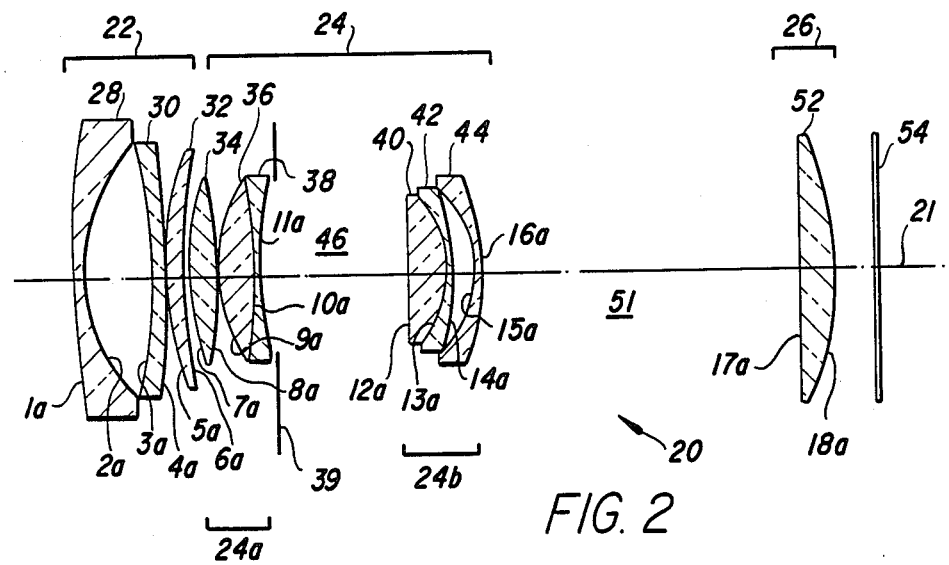
FIG. 2 is a diagram of the lens illustrated in FIG. 1 but in a long focal length condition.

The lens 20 represented in FIGS. 1 through 6 is a zoom lens intended for use in a photographic camera and has a focal length range of 29.3 to 116 mm i.e. a 4.0 to 1 zoom ratio. In FIG. 1 it is illustrated in the condition giving the former focal length and in FIG. 2 it is illustrated in the condition giving the latter focal length. In all illustrations and the descriptions thereof, throughout the specification, the lens is understood to be focussed at infinity. Additionally, it should be understood that all of the illustrative embodiments are dimensioned for use with a conventional 35 mm image format, i.e. a rectangular format of 24 mm by 36 mm, the diagonal of which is 43.26 mm. Obviously, the illustrative lenses can be modified to other image formats, and can be adapted to non-planar image surfaces.

The lens 20 has an axis 21 and includes three units 22, 24, and 26 of lens elements. The first unit 22 is at the front of the lens 20, that is, it is towards an object 27 to be photographed. The unit 22 moves both as a compensator during zooming and also for focusing. The variator unit 24 is between the units 22 and 26 and moves in zooming. The unit 26 is at the rear of the lens and, in the present embodiment, does not move.

The front unit 22 is negative and includes three elements 28, 30 and 32. The element 28 is at the front of the lens and is a negative meniscus. The element 30 is in the middle of the first unit and is a negative meniscus. The third element 32 is a positive meniscus.

The second or variator unit 24 is positive and includes six elements 34, 36, 38, 40, 42 and 44 formed in two sub-units, i.e. a positive sub-unit 24a of elements 34, 36 and 38 and a negative sub-unit 24b of elements 40, 42 and 44. The elements 36 and 38 form a cemented doublet as do the elements 40 and 42. The element 34 is biconvex. The element 36 is biconvex and the element 38 is biconcave and together they form a meniscus. An aperture stop 39 is located in close proximity to surface 11a, i.e. the rearward surface of lens element 38 of sub-unit 24a.

Figure 4:
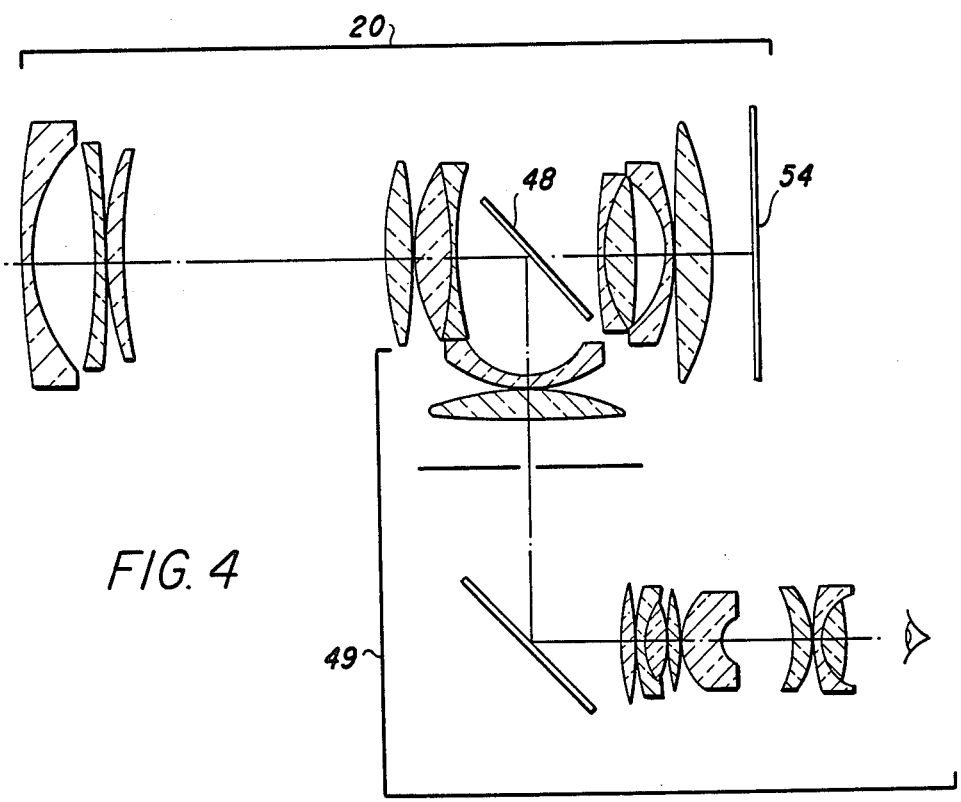
FIG. 4 is a diagram of the lens represented in FIGS. 1 to 4 together with viewfinder means, in a short focal length condition.
Figure 5:
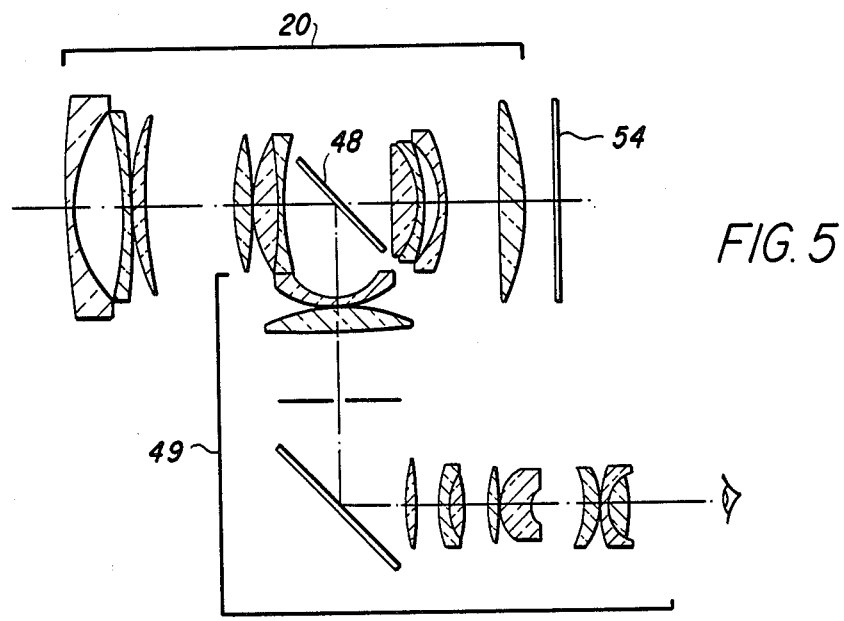
FIG. 5 is a diagram similar to FIG. 4 but in an intermediate focal length condition.
Figure 6:
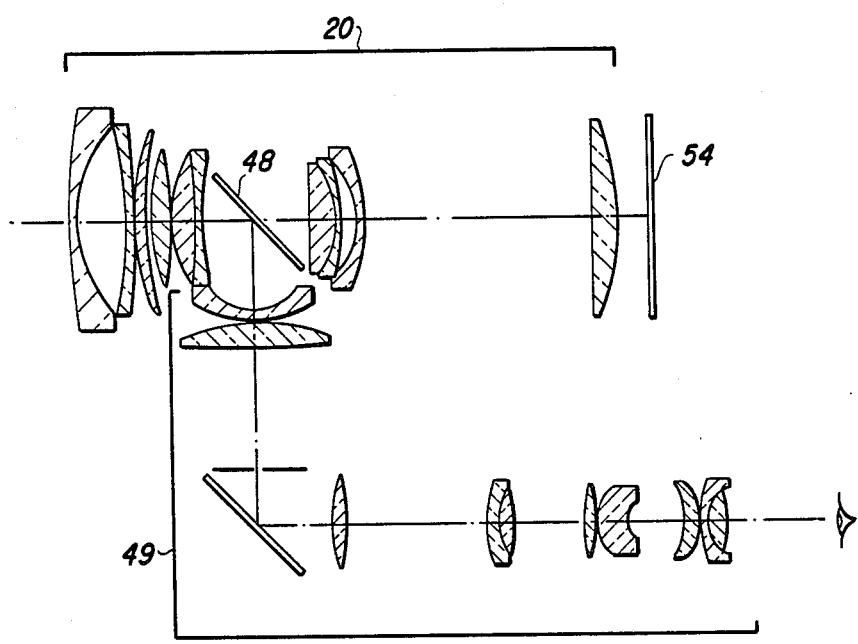
FIG. 6 is a diagram similar to FIGS. 4 and 5, but in a long focal length condition.

The element 40 is biconvex and the element 42 is a negative meniscus and together they form a positive doublet. The element 44 is a negative meniscus. There is an air space 46 between the elements 38 and 40. The air space 46 has an axial length which is sufficiently large that the air space 46 can accommodate reflective means, in the form of a mirror 48, (FIG. 3) which serves, in a manner similar to that performed by the movable mirror of a conventional SLR camera, to direct, to a viewfinder system, light rays from the object being photographed and which have passed through those elements of the taking lens forwardly of the mirror. In FIGS. 4 to 6, the viewfinder system is indicated by the reference numeral 49. FIGS. 4 to 6 show the taking lens 20, mirror 48 and viewfinder system 49 in three different conditions including the extreme short focal length and the maximum focal length positions. Alternatively, a mirror or other reflective means at the same location could be used for other than viewfinding purposes, e.g. as a part of an exposure control system, or could serve more than one of such purposes.

Figure 3:
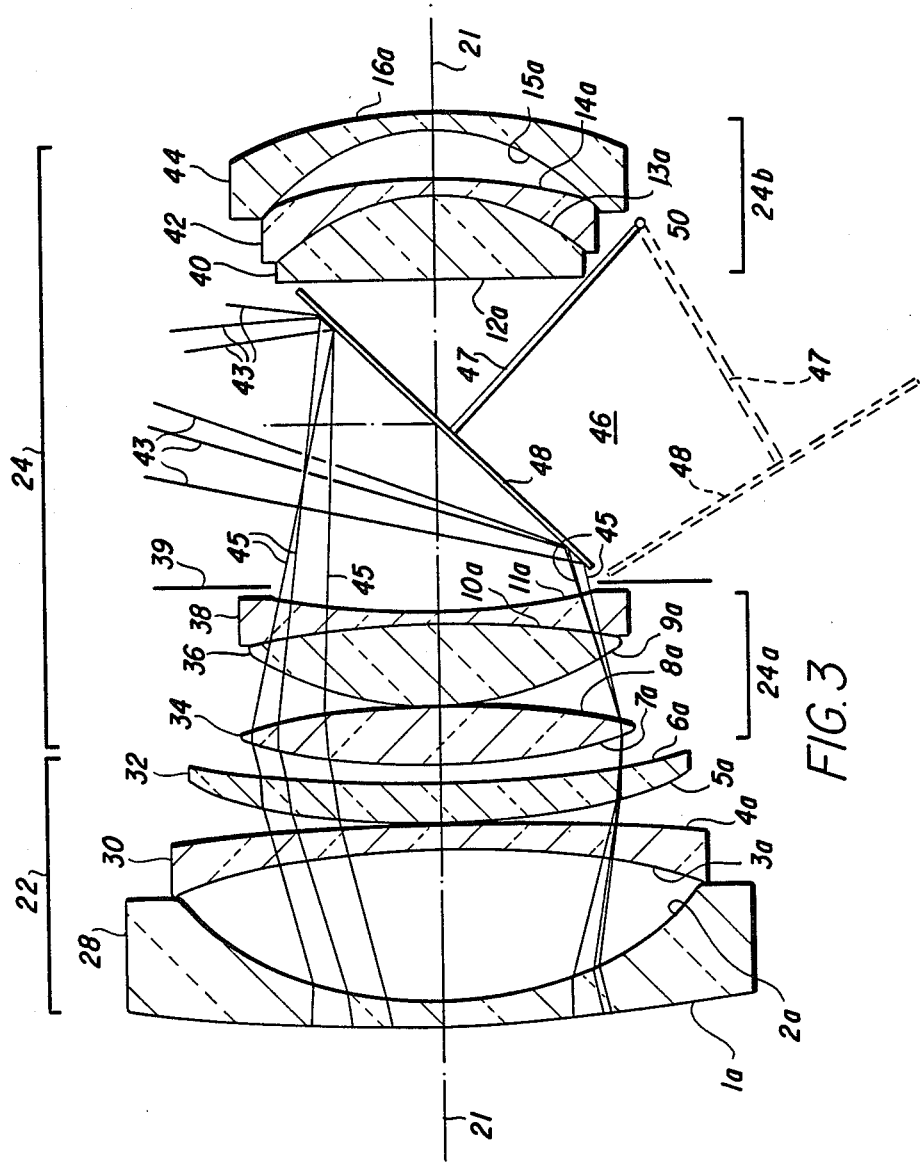
FIG. 3 is an enlarged portion of FIG. 2 additionally showing reflective means, in a viewing condition, for directing rays into a viewfinder system.

FIG. 3 illustrates the front and second lens units 22 and 24 on an enlarged scale and in their positions for maximum focal length of the lens 20. The illustrative mirror 48, is shown supported on an arm 47 for pivotal movement about a pivot 50. The pivot 50 for the mirror 48 is integral with the mount (not shown) for the second lens unit 24 so that the mirror moves with the second lens unit during zooming, but means other than the illustrated pivot arrangement could be used to allow the mirror to move between its viewing position and its taking position. The mirror is shown in solid line in its viewing position and in broken line in its taking position. In its viewing position, the mirror 48 is disposed at an angle (45° in the present embodiment) such that the incident rays 45 arriving from the lens element 38 are reflected, as rays 43, laterally of the axis 21, out from between the lens elements 38 and 40 into the viewfinder system, which is not shown in FIG. 3 but is shown in FIGS. 4, 5 and 6. The viewfinder forms part of an SLR Zoom Camera which is described and claimed in the previously mentioned U.S. Pat. application Ser. No. 107,139, filed on Oct. 9, 1987, now Pat. No. 4,757,372.

In this illustrative embodiment, the mirror is sufficiently large to intercept, in its viewing position, the largest raypath defined by approximately 90% of the dimensions of the image format, because of the standard industry practice of providing a viewfinder image with somewhat less object coverage than that of the corresponding image in the film plane.

It should be understood that the mirror arrangement described above can be used with other of the illustrative embodiments but need not be described again in connection with such embodiments.

As is the case in all of the illustrative embodiments, the first principal point of the second lens unit is located forwardly of the front vertex of the forwardmost positive lens element of that unit. The location of this point and other physical and focal parameters of this and all of the other illustrative embodiments are listed in Table 25, following the individual descriptions of the illustrative embodiments.

The third lens unit 26, which is rearmost, contains a single lens element 52 and is stationary. The element 52 is a biconvex positive element that provides field flattening so that the image is planar and on the film plane 54. The air space between the units 24 and 26 is referenced 51 and is, of course, variable.

As previously mentioned, the first lens unit 22 is negative; the second lens unit 24 is positive; and the third lens unit 26 is positive. However, the overall lens is more descriptively characterized as being of negative-positive-negative-positive configuration, i.e. unit 22 sub-unit 24a, sub-unit 24b and unit 26.

Various constructional parameters of the lens, when in its short focal length condition, are given in Table 1 below. The surfaces of the lens elements are referenced 1a through 18a. As is customary, contacting surfaces of a doublet are given the same reference numeral. In Table 1 and other similar tables, the spacing between lens elements is shown in the conventional manner under the heading "Thickness," by those dimensions having no corresponding refractive index number. All dimensions throughout this specification are in millimeters unless otherwise stated. All of the illustrative lens embodiments are intended for use in exposing conventional 35 mm film, the image area of which has a diagonal dimension of 43.26 mm.

TABLE 1

| SURFACE NO. | RADIUS | THICKNESS | REFRACTIVE INDEX d | Abbe V NUMBER | CLEAR APERTURE |
| --- | --- | --- | --- | --- | --- |
| 1a | 136.35 | 1.80 | 1.77250 | 49.6 | 43.08 |
| 2a | 26.31 | 11.06 | | | 36.07 |
| 3a | −72.81 | 1.78 | 1.48749 | 70.4 | 35.39 |
| 4a | −234.33 | 0.10 | | | 35.10 |
| 5a | 47.70 | 3.04 | 1.84666 | 23.8 | 34.29 |
| 6a | 99.09 | 43.34* | | | 33.69 |
| 7a | 42.53 | 4.35 | 1.69350 | 53.3 | 26.65 |
| 8a | −79.82 | 0.20 | | | 26.56 |
| 9a | 24.54 | 5.65 | 1.48749 | 70.4 | 24.80 |
| 10a | −78.48 | 1.00 | 1.84666 | 23.8 | 23.95 |
| 11a | 58.17 | 24.00 | | | 22.67 |
| 12a | −26243.13 | 6.00 | 1.59300 | 35.3 | 19.48 |
| 13a | −16.34 | 1.04 | 1.80420 | 46.5 | 20.52 |
| 14a | −42.83 | 3.65 | | | 22.29 |
| 15a | −15.01 | 1.20 | 1.77250 | 49.6 | 22.36 |
| 16a | −37.33 | 0.25* | | | 26.77 |
| 17a | 675.43 | 6.00 | 1.52249 | 59.5 | 38.23 |
| 18a | −50.95 | 6.50 | | | 38.71 |

*Zooming space

The spaces between elements 32 and 34, i.e. air space 33, and between elements 44 and 52, i.e. the air space 51, vary during zooming and some values, including the focal length extremes, are:

TABLE 2

| EFFECTIVE FOCAL LENGTH | AIR SPACE 33 | AIR SPACE 51 |
| --- | --- | --- |
| 29.3 | 43.34 | 0.25 |
| 50.0 | 19.32 | 12.20 |
| 85.0 | 5.91 | 32.49 |
| 116.0 | 0.89 | 50.66 |

The longest and shortest effective focal lengths listed in the preceeding table and in the corresponding tables following other illustrative embodiments are the extreme focal lengths and the corresponding zoom ratio is simply the ratio of those two figures.

Second Illustrative Embodiment

Figure 7:
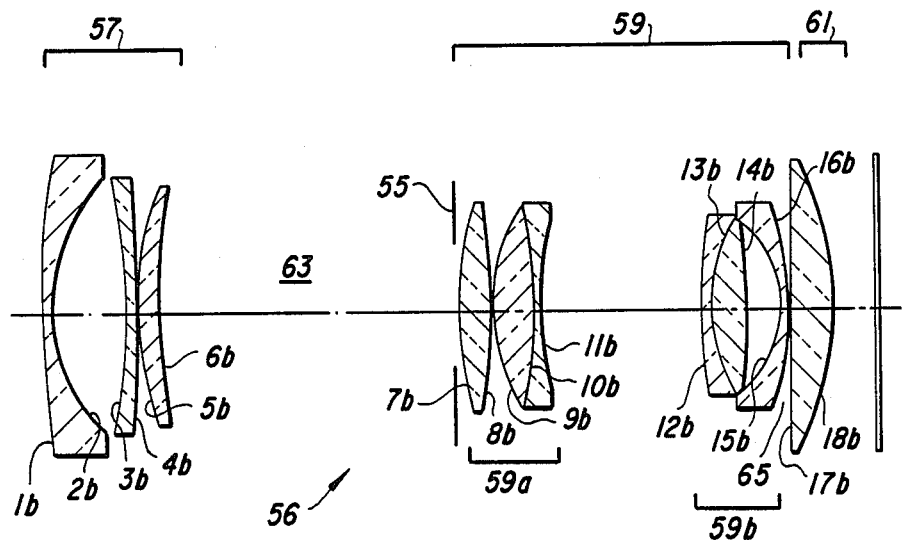
FIG. 7 is a diagram illustrating a lens in accordance with a second embodiment of the present invention, in a short focal length condition.
Figure 8:
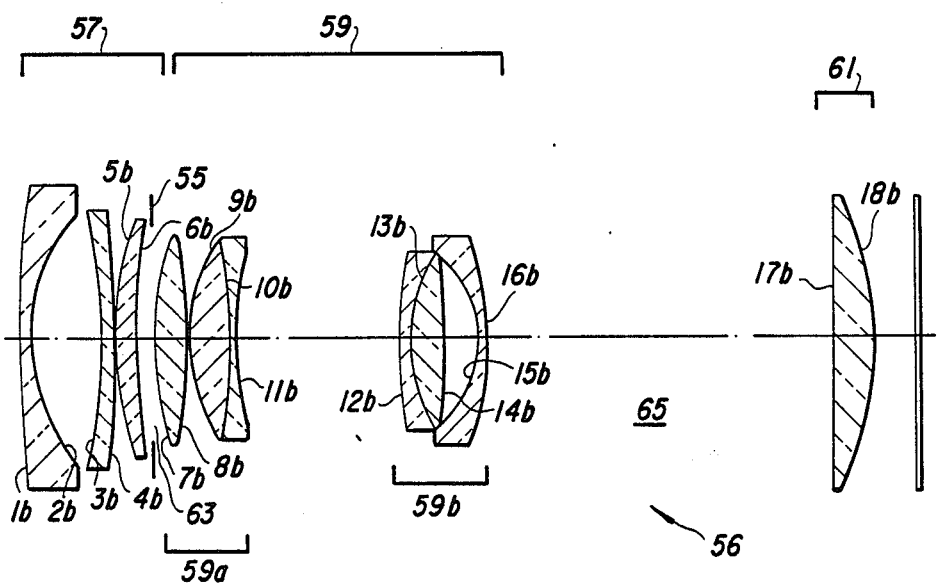
FIG. 8 is a diagram of the lens illustrated in FIG. 7, in a long focal length condition.

A 29.3 to 116.0 range zoom lens 56 in accordance with a second embodiment of the present invention is illustrated in FIGS. 7 and 8. This lens 56 also includes three units 57, 59 and 61 with the front unit 57 moving for focusing and for compensating during zooming and the second variator unit 59, comprising sub-units 59a and 59b, moving for zooming. The third unit 61 is stationary.

The ten elements of the lens 56 are constructed identically in generally type and in formation into doublets and units and sub-units, as are the ten elements of the first embodiment except that element 12b is a negative meniscus and element 13b is a biconvex positive element. Also, in this embodiment, the variable aperture stop 55 is located adjacent surface 7b forwardly of the first lens elements of unit 59.

Figure 9:
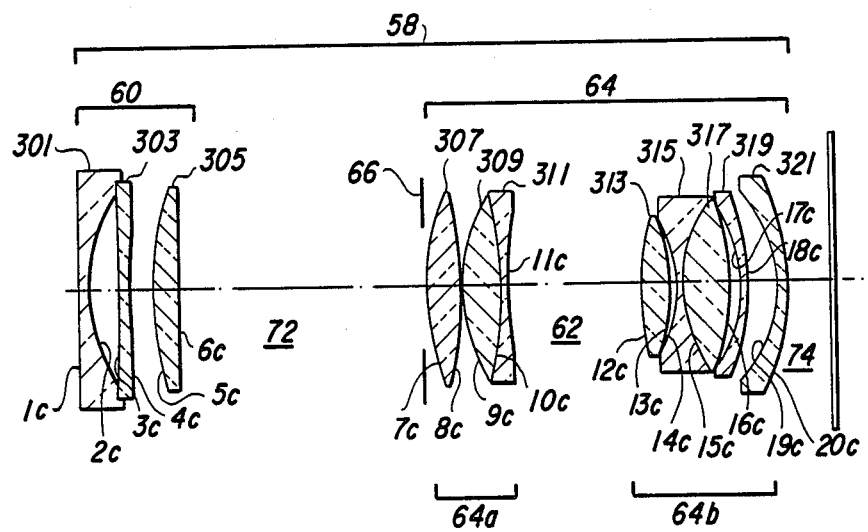
FIG. 9 is a diagram of a lens in accordance with a third embodiment of the present invention, in a short focal length condition.

The lens includes a large air space 67 in the second unit which is large enough, 23.5 mm., to accommodate reflective means as described above in relation to the first herein described embodiment. Various constructional parameters of the lens represented in FIGS. 8 and 9 are given for the short focal length condition in Table 3 below.

TABLE 3

| SURFACE NO. | RADIUS | THICKNESS | REFRACTIVE INDEX d | Abbe V NUMBER | CLEAR APERTURE |
| --- | --- | --- | --- | --- | --- |
| 1b | 150.63 | 1.80 | 1.77250 | 49.6 | 40.45 |
| 2b | 26.16 | 10.32 | | | 34.07 |
| 3b | −76.64 | 1.78 | 1.58913 | 61.3 | 33.08 |
| 4b | −216.81 | 0.10 | | | 32.76 |
| 5b | 47.79 | 3.04 | 1.84666 | 23.8 | 31.86 |
| 6b | 111.59 | 43.28* | | | 31.21 |
| 7b | 45.49 | 4.75 | 1.69350 | 53.3 | 27.09 |
| 8b | −73.96 | 0.20 | | | 27.00 |
| 9b | 24.86 | 6.03 | 1.48749 | 70.4 | 25.17 |
| 10b | −69.88 | 1.00 | 1.84666 | 23.8 | 24.20 |
| 11b | 58.02 | 23.51 | | | 22.89 |
| 12b | 80.55 | 1.27 | 1.80420 | 46.5 | 21.33 |
| 13b | 21.98 | 5.20 | 1.63980 | 34.6 | 21.95 |
| 14b | −95.84 | 5.02 | | | 22.47 |
| 15b | −14.60 | 1.20 | 1.77250 | 49.6 | 22.60 |
| 16b | −43.85 | 0.25* | | | 27.52 |
| 17b | 548.05 | 6.10 | 1.51680 | 64.2 | 38.92 |
| 18b | −47.25 | 6.48 | | | 39.29 |

*Zooming space

There are air spaces 63 and 65 between the units 57 and 59 and between the units 59 and 61, respectively, which vary during zooming and the thicknesses of these air spaces 63 and 65 at various effective focal lengths, including the focal length extremes, are as follows:

TABLE 4

| EFFECTIVE FOCAL LENGTH | AIR SPACE 63 | AIR SPACE 65 |
|---|---|---|
| 29.30 | 43.28 | 0.25 |
| 50.00 | 20.74 | 12.10 |
| 84.99 | 7.62 | 32.22 |
| 115.99 | 2.70 | 50.20 | is biconvex. The seventh element 319 in the sub-unit 64b, i.e. the fourth element after the air space 62, is a negative meniscus. The final element 321 in sub-unit 64b, which is at the back of the lens ahead of the variable air space 65, is a negative meniscus.

Various constructional parameters for this third illustrative embodiment in the short focal length condition are give in Table 5 below:

TABLE 5

| SURFACE NO. | RADIUS | THICKNESS | REFRACTIVE INDEX d | Abbe V NUMBER | CLEAR APERTURE |
|---|---|---|---|---|---|
| 1c | 527.19 | 1.57 | 1.83500 | 43.0 | 31.56 |
| 2c | 24.88 | 4.65 | | | 27.34 |
| 3c | −191.08 | 1.55 | 1.83500 | 43.0 | 27.32 |
| 4c | 238.55 | 3.22 | | | 26.99 |
| 5c | 48.32 | 3.39 | 1.83000 | 24.0 | 26.48 |
| 6c | 950.17 | 36.03* | | | 26.05 |
| 7c | 33.06 | 5.34 | 1.48749 | 70.4 | 25.23 |
| 8c | −55.72 | 0.17 | | | 25.16 |
| 9c | 23.69 | 5.65 | 1.50137 | 56.3 | 23.69 |
| 10c | −52.31 | 1.00 | 1.84666 | 23.8 | 22.99 |
| 11c | 84.66 | 19.50 | | | 21.97 |
| 12c | 34.63 | 4.40 | 1.48749 | 70.4 | 18.62 |
| 13c | −28.50 | 0.70 | | | 18.83 |
| 14c | −20.47 | 1.00 | 1.80420 | 46.5 | 18.83 |
| 15c | 19.85 | 6.76 | 1.68700 | 31.9 | 21.25 |
| 16c | −35.05 | 1.75 | | | 22.23 |
| 17c | −20.48 | 1.04 | 1.83500 | 43.0 | 22.34 |
| 18c | −32.89 | 4.15 | | | 24.01 |
| 19c | −19.74 | 1.31 | 1.77250 | 49.6 | 25.46 |
| 20c | −36.60 | 6.81* | | | 28.92 |

*Zooming space

Third Illustrative Embodiment

Figure 10:
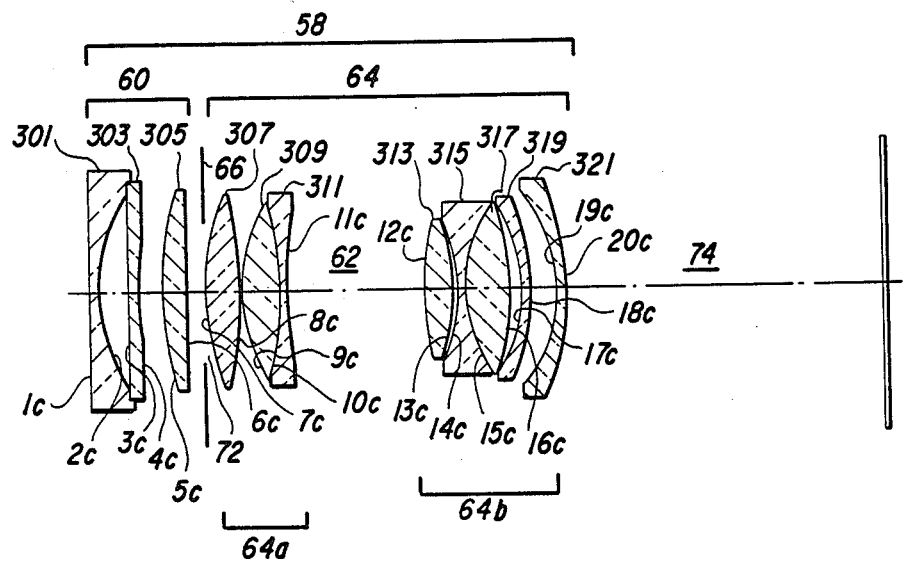
FIG. 10 is a diagram of the lens illustrated in FIG. 11, in a long focal length condition.

A 29.3 to 101.0 range zoom lens 58 in accordance with a third embodiment is illustrated in FIGS. 9 and 10. The lens 58 includes two lens element units 60 and 64. The front unit 60 moves for focusing and for compensating during zooming and the second variator unit 64, comprising sub-units 64a and 64b moves for zooming. In this embodiment there is no third unit between the movable second unit and the film plane.

The first unit 60 of lens elements includes a negative meniscus element 301 at the front of the lens. The next element is a biconcave element 303 and the third element is a positive meniscus element 305.

The second unit 64 of elements includes eight elements arranged in two sub-units. One sub-unit 64a and 64b. The forward sub-unit 64a consists of elements 307, 309 and 311 and is positive and the other sub-unit consists of elements 313, 315, 317, 319 and 321 and is negative. The first sub-unit 64a is ahead of the large air space 62, which is large enough to receive a mirror, as previously described, and the other sub-unit 64b is behind the air space 62. The first element of the sub-unit 64a is a biconvex element 307. The second and third elements 309 and 311 of that sub-unit are a cemented meniscus doublet. The element 309 is biconvex and the element 311 is biconcave. A variable aperture stop 66 is located near surface 76 of element 307 and is movable therewith.

Behind the air space 62 there is the fourth biconvex element 313 in sub-unit 64b and the fifth and sixth elements 315 and 317 in that sub-unit are a cemented doublet. The element 315 is biconcave and the element 317

Table 6 gives the length of the variable air spaces 72 and 74 for various effective focal lengths including the two focal length extremes.

TABLE 6

| EFFECTIVE FOCAL LENGTH | AIR SPACE 72 | AIR SPACE 74 |
|---|---|---|
| 29.30 | 36.03 | 6.81 |
| 50.00 | 16.53 | 18.13 |
| 85.01 | 5.17 | 37.49 |
| 101.02 | 2.60 | 46.65 |

Fourth Illustrative Embodiment

Figure 11:
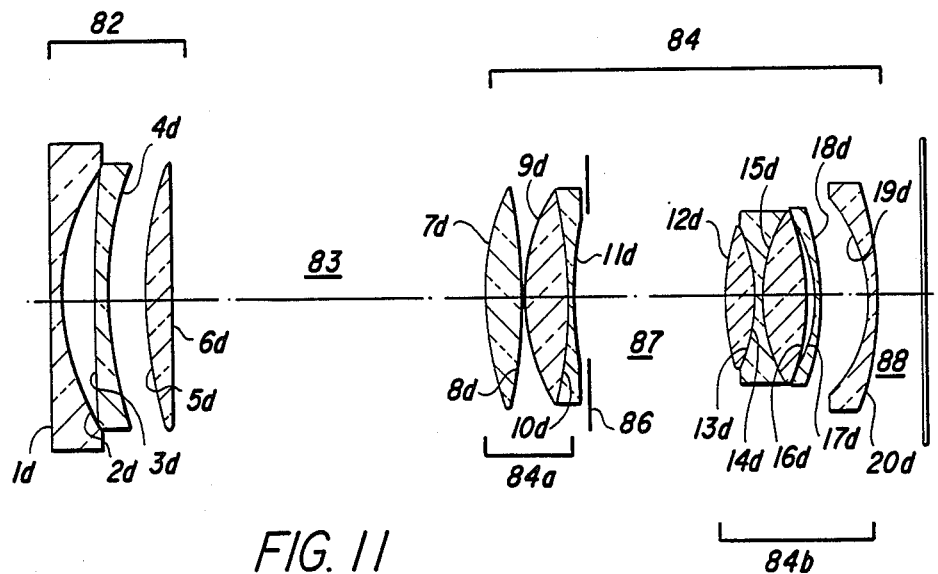
FIG. 11 is a diagram illustrating a lens which is a fourth embodiment of the present invention, in a short focal length condition.
Figure 12:
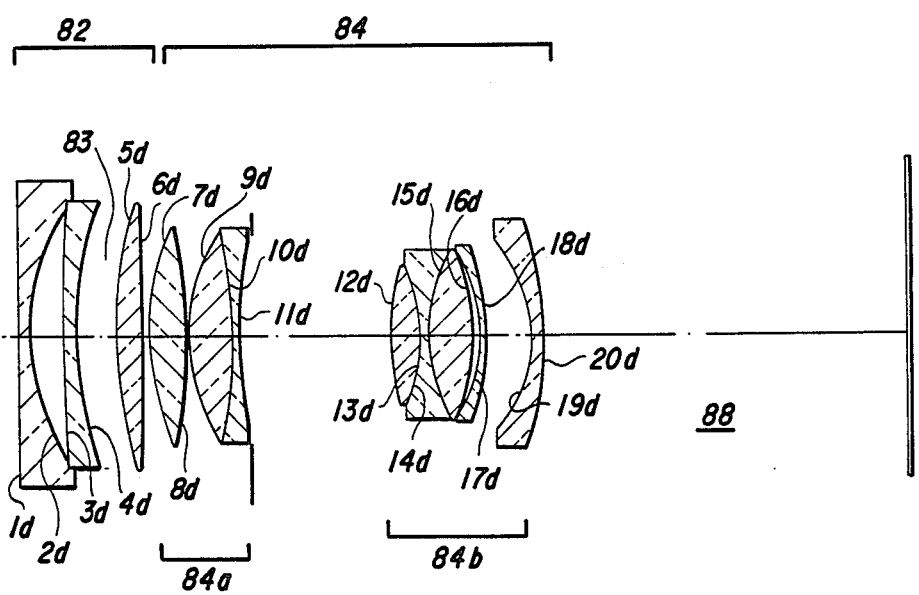
FIG. 12 is a diagram illustrating the lens illustrated in FIG. 11, in a long focal length condition.

A fourth embodiment of the invention in the form of a 29.3 to 116.0 range zoom lens is illustrated in FIGS. 11 and 12. Like the third embodiment, it includes only two units 82 and 84 of lens elements, the first being movable for focusing and for compensation during zooming and the latter for zooming. The air space between the two units 82 and 84 of lens elments is referenced 83 in FIGS. 14 and 15. There is a large air space 87, in the second variator lens unit 84 between surfaces 11d and 12d, and a variable aperture stop 86 is located within this air space adjacent surface 11d at the back of the forward sub-unit of lens unit 84.

In the fourth embodiment there are eleven lens elements arranged in two units, as in the third embodiment. The elements in the fourth embodiment are of the same types and sequence as in the third embodiment, except that the second lens element is a negative meniscus and the third lens element is biconvex.

Some of the lens constructional parameters are given in Table 7 below.

TABLE 7

| SURFACE NO. | RADIUS | THICKNESS | REFRACTIVE INDEX d | Abbe V NUMBER | CLEAR APERTURE |
|---|---|---|---|---|---|
| 1d | 1497.05 | 1.80 | 1.83500 | 43.0 | 40.70 |
| 2d | 32.74 | 4.95 | | | 35.40 |
| 3d | 594.43 | 1.78 | 1.83500 | 43.0 | 35.40 |
| 4d | 59.55 | 5.27 | | | 34.43 |
| 5d | 56.11 | 4.30 | 1.78470 | 26.1 | 34.80 |
| 6d | −370.00 | 45.14* | | | 34.52 |
| 7d | 36.58 | 5.58 | 1.48749 | 70.4 | 28.92 |
| 8d | −69.18 | 0.20 | | | 28.85 |
| 9d | 25.58 | 6.60 | 1.50137 | 56.3 | 27.09 |
| 10d | −60.42 | 1.00 | 1.84666 | 23.8 | 26.32 |
| 11d | 84.06 | 22.00 | | | 25.01 |
| 12d | 36.46 | 4.20 | 1.48749 | 70.4 | 18.74 |
| 13d | −26.01 | 0.29 | | | 18.71 |
| 14d | −22.94 | 1.00 | 1.80420 | 46.5 | 18.70 |
| 15d | 24.88 | 6.38 | 1.67270 | 32.2 | 20.65 |
| 16d | −32.50 | 1.09 | | | 21.76 |
| 17d | −21.63 | 0.80 | 1.83500 | 43.0 | 21.77 |
| 18d | −35.82 | 6.87 | | | 23.05 |
| 19d | −19.92 | 1.50 | 1.77250 | 49.6 | 25.90 |
| 20d | −48.90 | 6.50* | | | 30.21 |

*Zooming spaces

The length of the two variable air spaces 83 and 88 at various focal lengths, including the two focal length extremes, is given in Table 8 below:

TABLE 8

| EFFECTIVE FOCAL LENGTH | AIR SPACE 83 | AIR SPACE 88 |
|---|---|---|
| 29.30 | 45.14 | 6.50 |
| 50.00 | 20.51 | 17.56 |
| 85.01 | 6.16 | 36.41 |
| 116.01 | 0.68 | 53.52 |

Fifth Illustrative Embodiment

Figure 13:
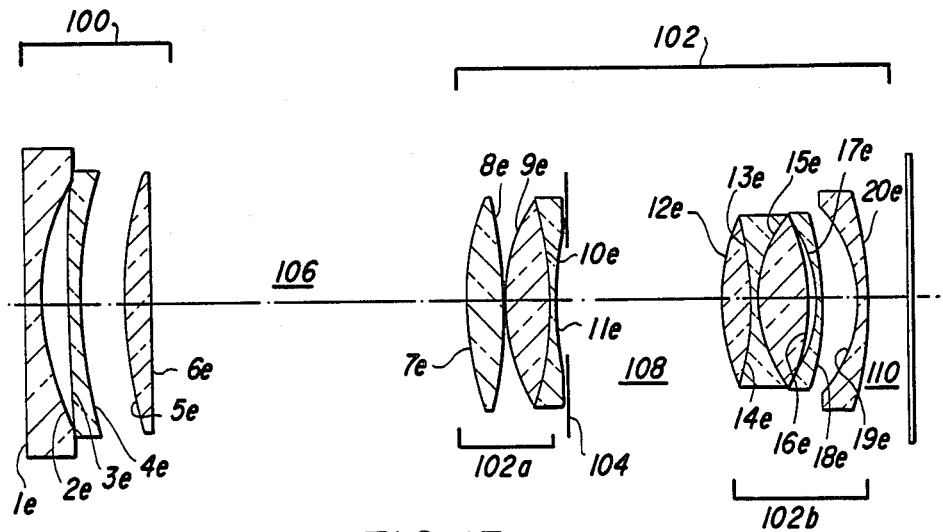
FIG. 13 is a diagram illustrating a lens which is a fifth embodiment of the present invention, in a short focal length condition.
Figure 14:
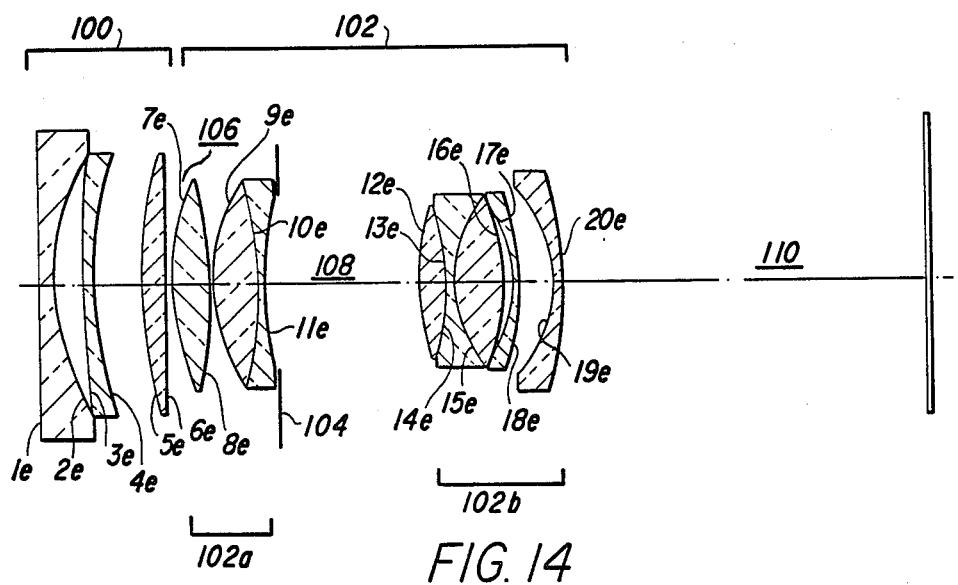
FIG. 14 is a diagram of the lens illustrated in FIG. 13, but in a long focal length condition.

A 29.3 to 116.0 range zoom lens in accordance with a fifth embodiment of the invention is illustrated in FIGS. 13 and 14. Like the third and fourth embodiments, this fifth embodiment includes two lens units 100 and 102. The forward lens unit 100 is movable for focusing and compensation during zooming and the second variator lens unit 102 is movable for zooming. A large air space 108 is provided in the second unit 102 of lens elements. In this embodiment, the large air space 108, capable of accommodating the reflective means, does not have a fixed dimension, but, like the air space 106 between the units 100 and 102, it is variable in length. In other words, the two sub-units 102a and 102b are movable not only together but also relative to one another. There is a variable aperture stop 104 which is near proximity to the surface 11e of the rearwardmost lens elements of lens sub-unit 102a.

The eleven lens elements in the fifth embodiment are of the same type and are in the same sequence as are the eleven lens elements in each of the third and fourth embodiments, except that the first element is biconcave and the third element is biconvex, unlike the fourth embodiment.

Some of the constructional parameters of the lens in its short focal length condition are given in Table 9 below:

TABLE 9

| SURFACE NO. | RADIUS | THICKNESS | REFRACTIVE INDEX d | Abbe V NUMBER | CLEAR APERTURE |
|---|---|---|---|---|---|
| 1e | −278.18 | 1.80 | 1.83500 | 43.0 | 40.70 |
| 2e | 37.82 | 3.89 | | | 35.99 |
| 3e | 238.35 | 1.80 | 1.83400 | 37.3 | 35.99 |
| 4e | 62.99 | 6.54 | | | 35.08 |
| 5e | 60.92 | 4.06 | 1.80518 | 25.5 | 35.19 |
| 6e | −731.43 | 46.22* | | | 34.86 |
| 7e | 38.66 | 5.89 | 1.51742 | 52.2 | 28.60 |
| 8e | −62.93 | 0.20 | | | 28.49 |
| 9e | 27.72 | 6.72 | 1.50137 | 56.3 | 26.61 |
| 10e | −49.55 | 1.00 | 1.84666 | 23.8 | 25.64 |
| 11e | 79.47 | 24.14* | | | 24.36 |
| 12e | 30.16 | 4.31 | 1.48749 | 70.4 | 20.53 |
| 13e | −39.52 | 0.20 | | | 20.54 |
| 14e | −40.93 | 1.00 | 1.80420 | 46.5 | 20.48 |
| 15e | 19.23 | 7.56 | 1.63980 | 34.6 | 21.35 |
| 16e | −28.45 | 1.04 | | | 22.16 |
| 17e | −20.44 | 1.00 | 1.83500 | 43.0 | 22.16 |
| 18e | −41.77 | 5.01 | | | 23.72 |
| 19e | −19.52 | 1.50 | 1.77250 | 49.6 | 25.09 |
| 20e | −61.52 | 6.50* | | | 29.55 |

*Zooming spaces

The lengths of the variable air spaces 106, 108 and 110 are given in the following Table 10 for various focal lengths, including the two focal length extremes:

TABLE 10

| EFFECTIVE FOCAL LENGTH | AIR SPACE 106 | AIR SPACE 108 | AIR SPACE 110 |
|---|---|---|---|
| 29.30 | 46.22 | 24.14 | 6.50 |
| 50.00 | 21.30 | 23.11 | 18.04 |
| 85.00 | 6.38 | 22.53 | 36.98 |
| 116.00 | 0.68 | 22.20 | 54.25 |

In that the large air space 108 in the second unit 102 of lens elements is variable in length, it is to be understood that even in the condition of the lens which makes the length of the air space 106 the shortest, which is the extreme long focal length condition in the present embodiment, there is space enough for the reflective means.

Sixth Illustrative Embodiment

A sixth embodiment of the present invention having a zoom range of 29.3 to 116.0 is generally similar in structure to the first embodiment described above with reference to FIGS. 1 to 6, except for different surface radii and other parameters and the fact that the element comprising surfaces 12–13 is biconvex rather than a positive meniscus as shown in FIG. 6. In this sixth embodiment, the aperture stop, similar to aperture stop 53, is located in near proximity to the surface 11f, corresponding to surface 11a. Various constructional parameters of this embodiment are listed in Table 11 below.

TABLE 11

| SURFACE NO. | RADIUS | THICKNESS | REFRACTIVE INDEX d | Abbe V NUMBER | CLEAR APERTURE |
|---|---|---|---|---|---|
| 1f | 196.37 | 2.20 | 1.77250 | 49.6 | 42.77 |
| 2f | 27.30 | 10.91 | | | 35.77 |
| 3f | −79.38 | 2.00 | 1.48749 | 70.4 | 34.91 |
| 4f | −508.48 | 0.10 | | | 34.57 |
| 5f | 51.91 | 3.15 | 1.84666 | 23.8 | 34.00 |
| 6f | 140.11 | 41.67* | | | 33.47 |
| 7f | 46.11 | 4.45 | 1.69350 | 53.3 | 26.89 |
| 8f | −75.90 | 0.20 | | | 26.82 |
| 9f | 25.45 | 5.75 | 1.48749 | 70.4 | 25.14 |
| 10f | −74.42 | 1.00 | 1.84666 | 23.8 | 24.28 |
| 11f | 62.02 | 26.00 | | | 23.06 |
| 12f | 150.58 | 6.00 | 1.59300 | 35.3 | 21.01 |
| 13f | −18.26 | 1.05 | 1.80610 | 40.7 | 21.76 |
| 14f | −42.29 | 3.35 | | | 23.24 |
| 15f | −16.30 | 1.20 | 1.80420 | 46.5 | 23.28 |
| 16f | −61.93 | 0.25* | | | 28.00 |
| 17f | 3765.78 | 6.00 | 1.62004 | 36.3 | 38.53 |
| 18f | −50.68 | 6.50 | | | 39.06 |

*Zooming spaces

Table 12 below gives the lengths of the variable air spaces 33' and 51', corresponding to spaces 33 and 51 in the first described embodiment, at various effective focal lengths of the lens, including the focal length extremes, are as follows:

TABLE 12

| EFFECTIVE FOCAL LENGTH | AIR SPACE 33' | AIR SPACE 51' |
|---|---|---|
| 29.30 | 41.67 | 0.25 |
| 50.00 | 19.01 | 12.15 |
| 85.00 | 5.84 | 32.42 |
| 116.02 | 0.89 | 50.48 |

Seventh Illustrative Embodiment

Figure 15:
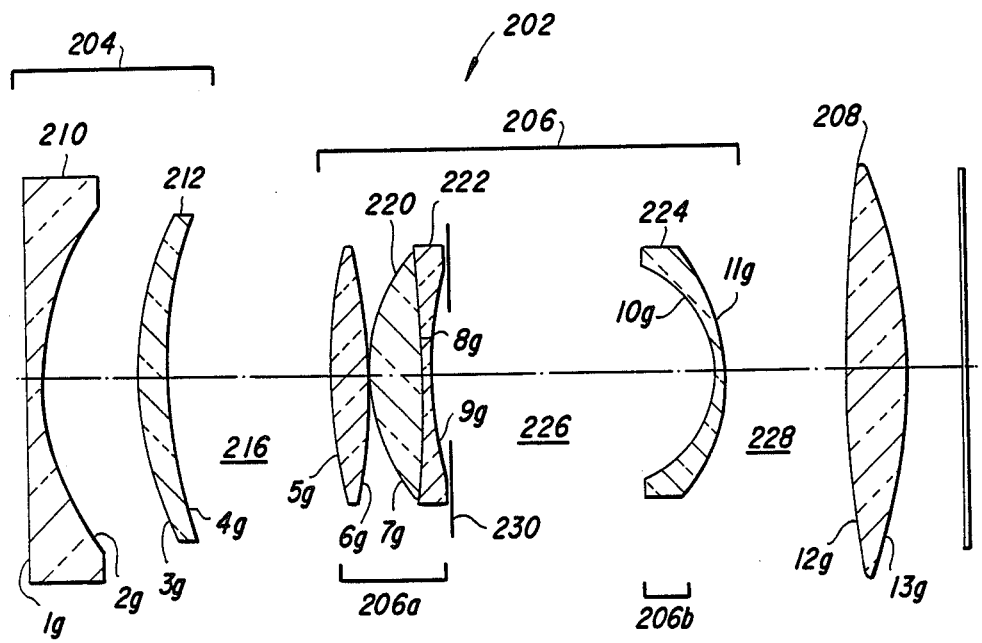
FIG. 15 is a diagram illustrating a lens which is a seventh embodiment of the present invention, in a intermediate focal length condition.

A seventh embodiment of the present invention having a zoom range of 29.3 to 116.0 is represented in FIG. 15 which shows a lens 202 which includes a first lens element unit 204 at the front of the lens, a second lens element unit 206 and a field flattening element 208. The second variator unit 206 moves for zooming and the first element 204 moves for focusing and compensation during zooming.

Unlike the other illustrative embodiments in which the first lens unit includes two negative elements, the front element 210 of this embodiment is a negative meniscus and the only other lens element 212 in the first lens unit is a positive meniscus. There is a variable air space 216 between the first and second units 204 and 206.

The second variator unit 206 includes two sub-units the first of which, 206a, includes three lens elements 218, 220 and 222, followed by a variable aperture stop 230. The second sub-unit 206b comprises a single element 224. The first sub-unit 206a is a positive and the second sub-unit 206b is negative. The front element 218 of the sub-unit 206a is biconvex. The second and third elements 220 and 222 of sub-unit 206a are formed as a doublet and are, respectively, biconvex and biconcave lenses. This embodiment is also different from the other illustrative embodiments in that the second sub-unit 206 has only one element, namely negative meniscus 204.

Figure 21:
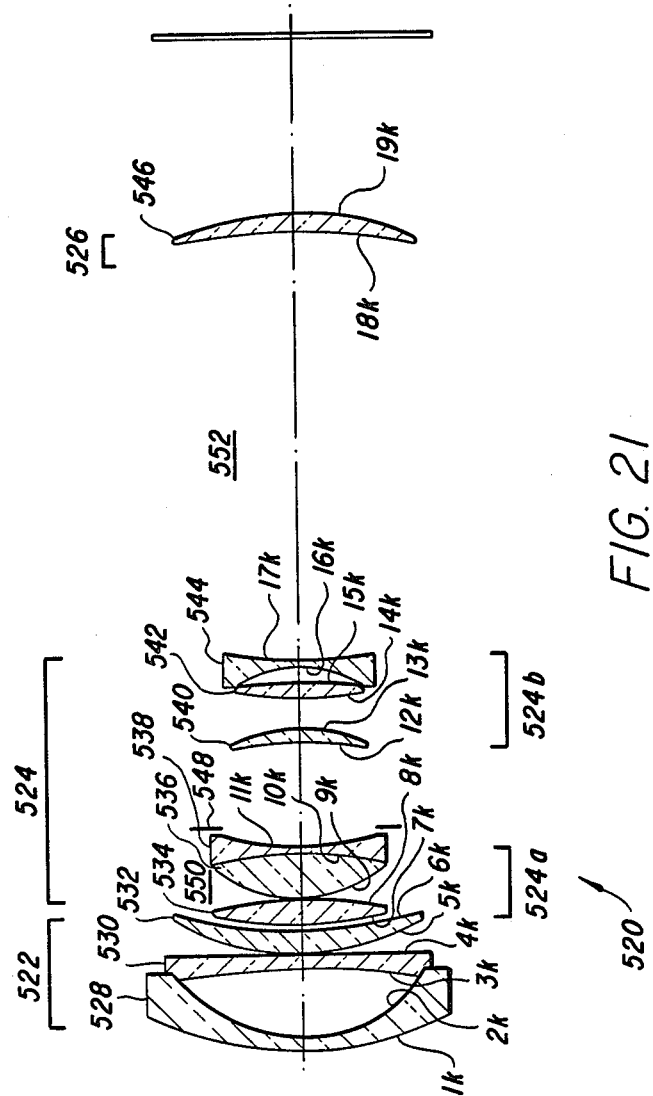
FIG. 21 is a diagram of the lens illustrated in FIG. 20 but in a long focal length condition.

There is a large air gap 226 between the third and fourth elements of the second unit 206 and biconvex field flattening element 208 is separated from the second unit 206 by a variable air space referenced 228 in FIG. 21.

Table 13, below, gives the radii of the surfaces 1g to 13g of the elements of the lens 202; the thicknesses of the air spaces in the short focal length condition; characteristics of the materials of the elements; and the clear apertures of the elements:

TABLE 13

| SURFACE NO. | RADIUS | THICKNESS | REFRACTIVE INDEX d | Abbe V NUMBER | CLEAR APERTURE |
| --- | --- | --- | --- | --- | --- |
| 1g | 2134.57 | 2.00 | 1.77250 | 49.6 | 41.41 |
| 2g | 30.07 | 10.56 | | | 35.47 |
| 3g | 38.80 | 3.20 | 1.84666 | 23.8 | 32.88 |
| 4g | 54.57 | 38.34* | | | 31.76 |
| 5g | 55.73 | 4.10 | 1.69350 | 53.3 | 25.82 |
| 6g | −70.12 | 0.20 | | | 25.63 |
| 7g | 20.67 | 5.85 | 1.50137 | 56.3 | 24.01 |
| 8g | −117.34 | 1.00 | 1.84666 | 23.8 | 23.12 |
| 9g | 48.71 | 31.01 | | | 21.85 |
| 10g | −12.17 | 1.20 | 1.80420 | 46.5 | 20.74 |
| 11g | −20.92 | 0.25* | | | 25.18 |
| 12g | 126.28 | 6.90 | 1.80610 | 40.7 | 42.23 |
| 13g | −62.59 | 6.50 | | | 42.36 |

*Zooming spaces

Table 14, which follows, gives the lengths of the air spaces for various effective focal lengths, including the two focal length extremes, of the lens.

TABLE 14

| EFFECTIVE FOCAL LENGTH | AIR SPACE 216 | AIR SPACE 228 |
| --- | --- | --- |
| 29.30 | 38.34 | 0.25 |
| 50.00 | 17.51 | 12.86 |
| 85.00 | 5.44 | 32.33 |
| 116.01 | 0.89 | 53.27 |

Eighth Illustrative Embodiment

Figure 16:
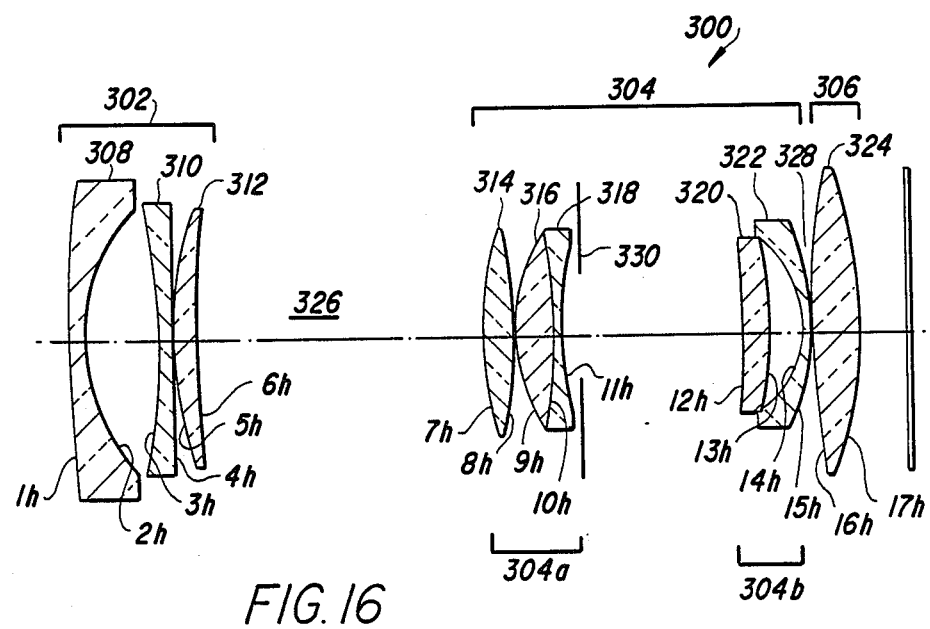
FIG. 16 is a diagram illustrating a lens which is an eighth embodiment of the present invention, in a short focal length condition.
Figure 17:
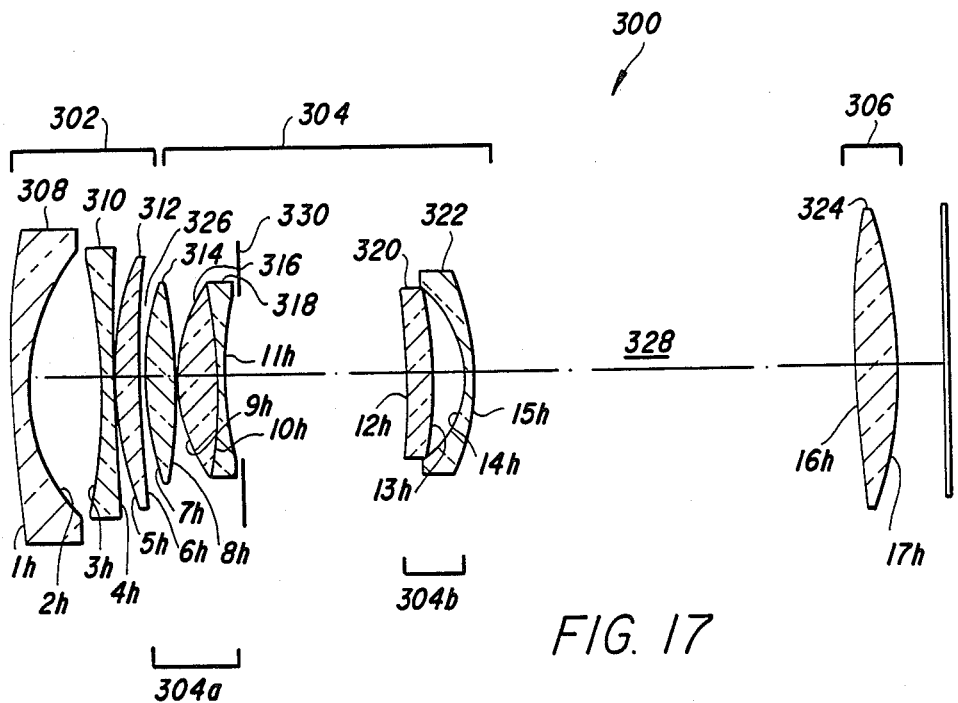
FIG. 17 is a diagram of the lens illustrated in FIG. 16 but in a long focal length condition.

An eighth embodiment of the present invention with a zoom range of 29.3 to 116.1 is illustrated in FIGS. 16 and 17 and includes a first unit 302 at the front of the lens, a second unit 304 and a third unit 306. The first unit 302 is movable for compensating during zooming and for focusing, the second variator unit 304 is movable for zooming and the third unit 306 is fixed.

The first unit 302 includes a first element 308, which is a negative meniscus, a second element 310, which is a negative meniscus, and a third element 312, which is a positive meniscus.

The sub-unit 304a of the second variator unit 304 is positive and includes a biconvex element 314 and a doublet formed of a biconvex element 316 and a biconcave element 318. A variable aperture stop 330 is located close to the rearward surface of lens element 318 of sub-unit 304a, in the large air space between the two sub-units. The second sub-unit is negative and includes an element 320, which is a positive meniscus and an element 322, which is a negative meniscus.

The third unit 306 comprises a single element 324, which is biconvex and which flattens the field.

Various constructional parameters of the lens 300, when in short focal length condition, are given in Table 15 below:

TABLE 15

| SURFACE NO. | RADIUS | THICKNESS | REFRACTIVE INDEX d | Abbe V NUMBER | CLEAR APERTURE |
| --- | --- | --- | --- | --- | --- |
| 1h | 178.81 | 2.20 | 1.77250 | 49.6 | 42.99 |
| 2h | 27.07 | 10.57 | | | 35.90 |
| 3h | −97.04 | 2.00 | 1.48749 | 70.4 | 35.10 |
| 4h | 356.84 | 0.10 | | | 34.61 |
| 5h | 51.05 | 3.25 | 1.84666 | 23.8 | 34.26 |
| 6h | 165.03 | 41.11* | | | 33.80 |
| 7h | 44.49 | 4.45 | 1.69350 | 53.3 | 26.67 |
| 8h | −74.60 | 0.20 | | | 26.59 |
| 9h | 24.56 | 5.75 | 1.48749 | 70.4 | 24.81 |
| 10h | −72.47 | 1.00 | 1.84666 | 23.8 | 23.95 |
| 11h | 55.97 | 26.00 | | | 22.65 |
| 12h | −145.36 | 3.96 | 1.84666 | 23.8 | 20.89 |
| 13h | −58.17 | 4.73 | | | 22.35 |
| 14h | −14.72 | 1.20 | 1.80420 | 46.5 | 22.62 |
| 15h | −36.76 | 0.25* | | | 27.29 |
| 16h | 128.47 | 6.90 | 1.62004 | 36.3 | 40.57 |
| 17h | 60.92 | 6.78 | | | 40.80 |

*Zooming spaces

There is a variable air space 326 between the first and second units and a variable air space 328 between the second and third units. The lengths of the variable air spaces 326 and 328 for various focal lengths, including the focal length extremes, are given in Table 16 below:

TABLE 16

| EFFECTIVE FOCAL LENGTH | AIR SPACE 326 | AIR SPACE 328 |
| --- | --- | --- |
| 29.29 | 41.11 | 0.25 |
| 49.99 | 18.75 | 13.08 |
| 85.01 | 5.77 | 34.91 |
| 116.06 | 0.90 | 54.29 |

Ninth Illustrative Embodiment

Figure 18:
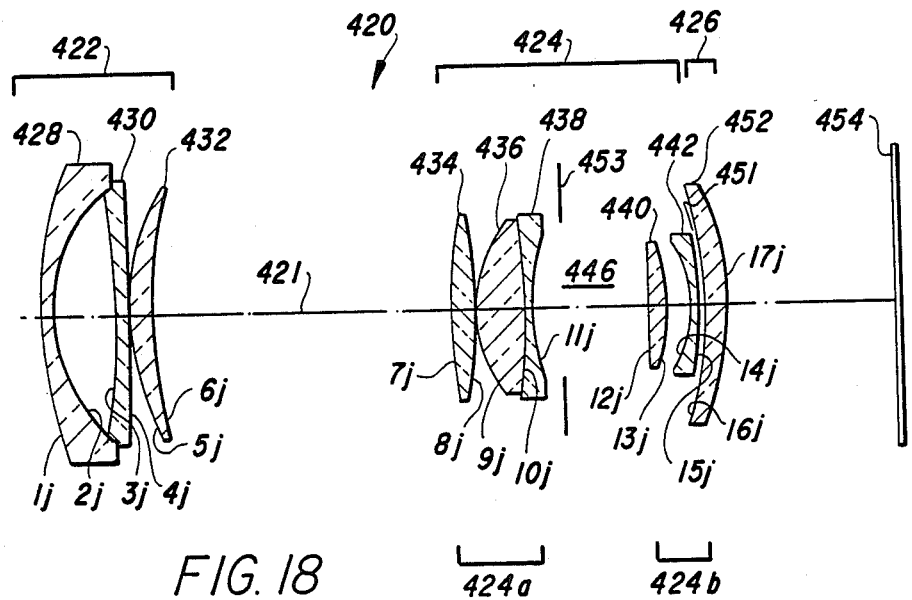
FIG. 18 is a diagram illustrating a lens which is a ninth embodiment of the present invention, in a short focal length condition.
Figure 19:
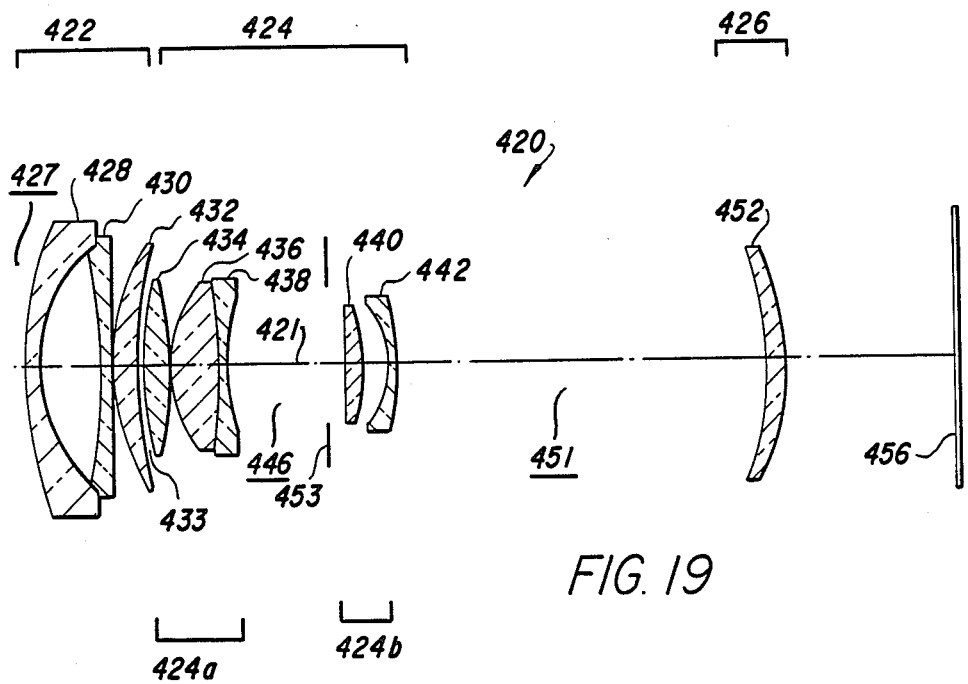
FIG. 19 is a diagram of the lens illustrated in FIG. 18 but in a long focal length condition.

FIGS. 18 and 19 illustrate a ninth embodiment of the invention with a zoom range of 36.5 to 116.0. In FIG. 26 it is illustrated in the condition giving the former focal length and in FIG. 19 it is illustrated in the condition giving the latter focal length.

The lens 420 has an axis 421 and includes three lens element units 422, 424, and 426. The forward unit 422 is at the front of the lens 420, that is, it is towards an object 427 to be photographed. The unit 422 moves both for compensation during zooming and for focusing. The unit 426 is at the rear of the lens and, in the present embodiment, does not move. The variator unit 424 is between the units 422 and 426 and moves in zooming.

The front unit 422 is negative and includes three elements 428, 430 and 432. The element 428 is located on the object side of the lens and is a negative meniscus. The element 430 is in the middle of the first unit and is a negative meniscus. The third element 432 is a positive meniscus.

The second variator unit 424 is positive and includes five elements 434, 436, 438, 440 and 442 formed in two sub-units, i.e. a sub-unit 424a of elements 434, 436 and 438 and a sub-unit 424b of elements 440 and 442. The elements 436 and 438 form a cemented doublet. The element 434 is biconvex. The element 436 is biconvex and the element 438 is biconcave and together they form a meniscus.

There is an aperture stop 453 located between elements 438 and 440. As can be seen by comparing FIGS. 18 and 19, the aperture stop is movable relative to the two sub-units during the zooming movement of the units.

The element 440 is a positive meniscus and the element 442 is a negative meniscus and together they form a sub-unit 424b. There is a large air space 446 between the elements 438 and 440.

The third lens unit 426, which is rearmost, comprises a single lens element 452 and is stationary. The element 452, is a positive meniscus and provides field flattening so that the image is planar and on the film plane 454. The air space between the units 424 and 426 is referenced 451 and is, of course, variable.

The first lens unit 422 is negative; the second lens unit 24 is positive with the sub-unit 424a being positive and the sub-unit 424b being negative; and the third lens unit 426 is positive.

Various constructional parameters of the lens, when in its short focal length condition, are given in Table 17 below:

TABLE 17

| SURFACE NO. | RADIUS | THICKNESS | REFRACTIVE INDEX d | Abbe V NUMBER | CLEAR APERTURE |
| --- | --- | --- | --- | --- | --- |
| 1j | 57.11 | 2.00 | 1.80420 | 46.3 | 41.12 |
| 2j | 24.06 | 9.20 | | | 35.04 |
| 3j | −95.68 | 1.80 | 1.77250 | 49.4 | 35.04 |
| 4j | −898.60 | 0.10 | | | 34.88 |
| 5j | 37.42 | 3.20 | 1.84666 | 23.6 | 34.37 |
| 6j | 65.35 | 43.5* | | | 33.80 |
| 7j | 64.31 | 3.70 | 1.65844 | 50.6 | 24.83 |
| 8j | −66.87 | 0.10 | | | 24.55 |
| 9j | 18.87 | 7.18 | 1.51742 | 51.9 | 22.80 |
| 10j | −81.11 | 1.00 | 1.84666 | 23.6 | 21.18 |
| 11j | 33.99 | 16.25 | | | 19.79 |
| 12j | −198.8 | 2.70 | 1.69895 | 29.8 | 16.70 |
| 13j | −23.75 | 3.34 | | | 17.00 |
| 14j | −14.89 | 1.20 | 1.83500 | 42.8 | 17.10 |
| 15j | −46.49 | 0.70* | | | 17.20 |
| 16j | −53.59 | 3.00 | 1.64000 | 59.9 | 31.47 |
| 17j | −40.60 | 24.99 | | | 32.10 |

*Zooming spaces

Table 18 below lists some representative values of air spaces 433 and 451 and of the location of aperture stop 453 relative to surface 11j at different zoom conditions, including the focal length extremes.

TABLE 18

| EFFECTIVE FOCAL LENGTH | AIR SPACE 433 | AIR SPACE 451 | DISTANCE 11j-453 | DISTANCE 453-12j |
| --- | --- | --- | --- | --- |
| 36.5 | 43.5 | 0.7 | 2.5 | 14.62 |
| 50. | 26.75 | 9.63 | 6.75 | 10.37 |
| 85. | 8.12 | 32.84 | 11.00 | 6.12 |
| 115. | 1.00 | 53.37 | 16.25 | 0.87 |

Tenth Illustrative Embodiment

Figure 20:
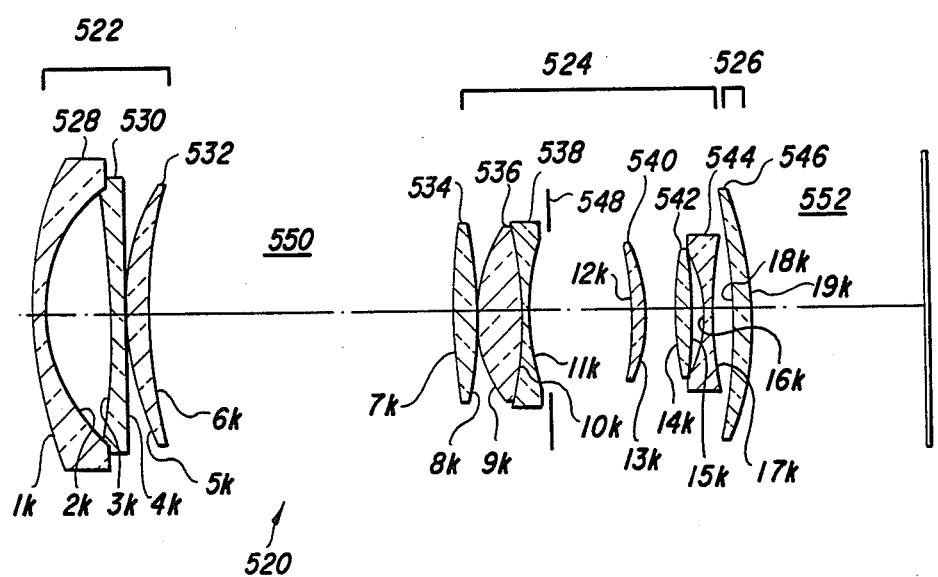
FIG. 20 is a diagram illustrating a lens which is a tenth embodiment of the present invention, in a short focal length condition.

A tenth embodiment of the invention is shown in FIGS. 20 and 21, which shows a 36.5 to 116.0 range zoom lens 520 including a first lens element unit 522 and a second lens element unit 524 and a third lens unit 526. The forward unit 520 moves both for focusing and for compensating during zooming; the variator unit 524, comprising sub-units 524a and 524b, moves for zooming; and the rearward unit 526, which is a single field flattening lens 546, does not move.

The front element unit 522 is negative and includes three elements 528, 530 and 532. The element 528 is located on the object side of the lens and is a negative meniscus. The element 530 is in the middle of the first unit and is a biconcave. The third element 532 is a positive meniscus.

The second unit 524 is positive and includes six elements 534, 536, 538, 540, 542 and 544, which are formed in two sub-units, i.e. sub-unit 528a of elements 534, 536 and 538 and sub-unit 524b of elements 540, 542 and 544. The elements 536 and 538 form a cemented doublet. The element 534 is biconvex. The element 540 is a positive meniscus and elements 542 and 544 are respectively biconvex and biconcave. The field flattening element 546 is a positive meniscus.

An aperture stop 548 is located between the two units adjacent surface 11k of lens element 238.

The first lens unit 522 is negative; the second lens unit 524 is positive, with sub-unit 524a being positive and sub-unit 524b being negative; and the third lens unit 526 is positive.

It should be noted that in this embodiment there is insufficient room for a full-size mirror in the air space between the sub-units, but ample room for a smaller mirror, e.g. for auto-focus or exposure control. Because the location of a mirror in the various embodiments is adjacent an aperture stop between the sub-units, the mirror, regardless of its size, will intercept rays representing the entire image format.

Various constructional parameters of the lens, when in its short length focal condition are given in Table 19.

TABLE 19

| SURFACE NO. | RADIUS | THICKNESS | REFRACTIVE INDEX d | Abbe V NUMBER | CLEAR APERTURE |
|---|---|---|---|---|---|
| 1k | 51.94 | 2.00 | 1.80420 | 46.5 | 42.38 |
| 2k | 23.81 | 9.69 | | | 35.97 |
| 3k | −110.79 | 1.80 | 1.80420 | 46.5 | 35.96 |
| 4k | 897.67 | 0.10 | | | 35.71 |
| 5k | 37.85 | 3.45 | 1.84666 | 23.6 | 35.29 |
| 6k | 68.56 | 44.37 | | | 34.61 |
| 7k | 69.28 | 3.60 | 1.60311 | 60.7 | 23.85 |
| 8k | −59.48 | 0.10 | | | 23.69 |
| 9k | 21.06 | 6.57 | 1.51680 | 64.2 | 22.86 |
| 10k | −55.75 | 1.00 | 1.80610 | 33.3 | 21.73 |
| 11k | 38.81 | 14.99 | | | 20.47 |
| 12k | −44.87 | 2.10 | 1.48749 | 70.4 | 17.61 |
| 13k | −23.61 | 4.18 | | | 17.59 |
| 14k | 54.16 | 2.30 | 1.63854 | 55.5 | 17.83 |
| 15k | −133.45 | 2.06 | | | 17.90 |
| 16k | −18.38 | 1.10 | 1.48749 | 70.4 | 17.91 |
| 17k | 55.97 | 2.92 | | | 19.82 |
| 18k | −89.21 | 3.00 | 1.48749 | 70.4 | 33.06 |
| 19k | −43.73 | 25.00 | | | 33.51 |

The lengths of the variable air spaces 550 and 552 are given in Table 20 below for various focal lengths, including the focal length extremes.

| EFFECTIVE FOCAL LENGTH | AIR SPACE 550 | AIR SPACE 552 |
|---|---|---|
| 36.5 | 44.37 | 2.92 |
| 50.0 | 27.24 | 12.79 |
| 85.0 | 8.19 | 38.42 |
| 116.0 | 0.92 | 61.12 |

Eleventh Illustrative Embodiment

Figure 22:
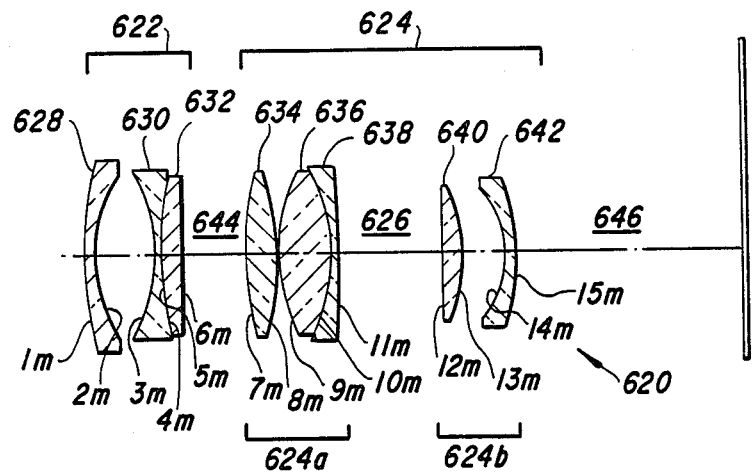
FIG. 22 is a diagram illustrating a lens which is a eleventh embodiment of the present invention, in a short focal length condition.
Figure 23:
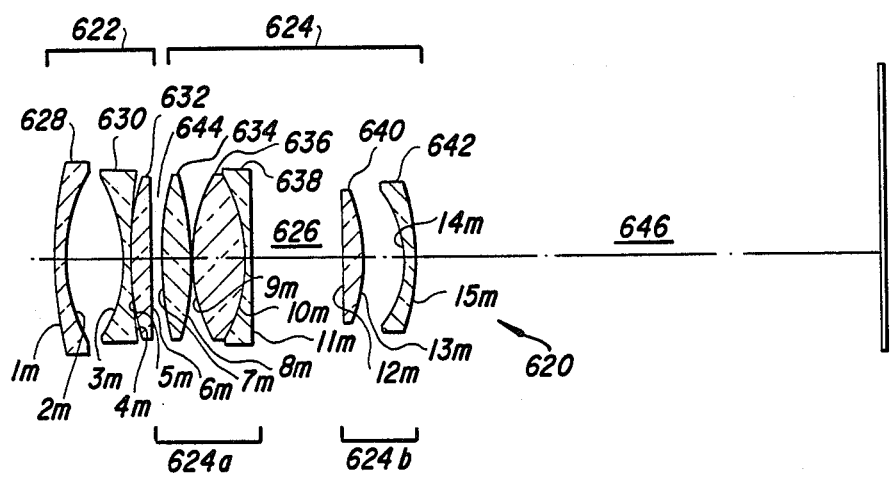
FIG. 23 is a diagram of the lens illustrated in FIG. 22 but in a long focal length condition.

An eleventh illustrative embodiment of the invention is illustrated in FIGS. 22 and 23 in the form of a zoom lens 620 with a zoom range of 36.5 to 67.5. The lens includes a first lens element unit 622 and a second lens unit 624 comprising sub-units 624a and 624b. The forward lens element unit 622 moves for focusing and for compensating during zooming, the second variator lens unit 624 moves for zooming and the two lens element sub-units 624a and 624b also move relative to each other during zooming, thereby changing the large air space 626 between the sub-units.

The forward lens element unit 622 is negative and includes three elements 628, 630 and 632. Element 628 is a negative meniscus, element 630 is biconcave and element 632 is biconvex.

The second unit 624 is positive and includes five elements, namely elements 634, 636 and 638 in sub-unit 624a and elements 640 and 642 in sub-unit 624b. In the first sub-unit which is positive, element 634 is biconvex and biconvex element 636 and negative meniscus 638 form a biconvex doublet. In the second sub-unit 624b, which is the forward element 640 is plano convex and the rearward element 642 is a negative meniscus.

Various constructional parameters of the lens at its short focal length extreme are given in Table 21 below:

TABLE 21

| SURFACE NO. | RADIUS | THICKNESS | REFRACTIVE INDEX d | Abbe V NUMBER | CLEAR APERTURE |
|---|---|---|---|---|---|
| 1m | 37.60 | 1.20 | 1.80420 | 46.5 | 19.42 |
| 2m | 16.05 | 6.50 | | | 17.22 |
| 3m | −16.92 | 1.00 | 1.48749 | 70.4 | 15.95 |
| 4m | 109.03 | 0.10 | | | 16.09 |
| 5m | 47.35 | 2.10 | 1.84666 | 23.8 | 16.16 |
| 6m | −168.03 | 6.82 | | | 16.06 |
| 7m | 31.27 | 3.50 | 1.48749 | 70.4 | 16.63 |
| 8m | −29.77 | 0.20 | | | 16.78 |
| 9m | 19.77 | 5.50 | 1.48749 | 70.4 | 16.46 |
| 10m | −18.38 | 1.00 | 1.84666 | 23.8 | 15.77 |
| 11m | −115.89 | 12.16 | | | 15.55 |
| 12m | −56.40 | 2.00 | 1.72825 | 28.3 | 12.88 |
| 13m | −17.84 | 4.48 | | | 13.11 |
| 14m | −10.81 | 1.20 | 1.83500 | 43.0 | 12.97 |
| 15m | −25.80 | 25.00 | | | 14.75 |

The lengths of the three variable air spaces 626, 644 and 646 are given in Table 21 below for various focal lengths, including the focal length extremes.

TABLE 22

| EFFECTIVE FOCAL LENGTH | AIR SPACE 626 | AIR SPACE 644 | AIR SPACE 646 |
|---|---|---|---|
| 36.50 | 6.82 | 6.66 | 25.00 |
| 50.00 | 3.31 | 5.26 | 36.84 |
| 67.51 | 0.75 | 4.66 | 51.35 |

Twelfth Illustrative Embodiment

Figure 24:
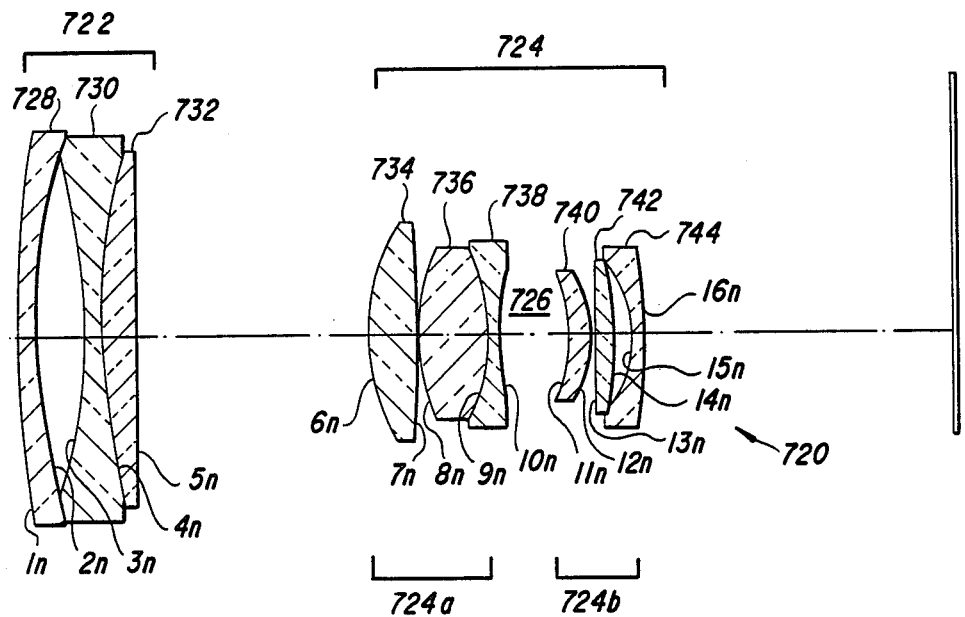
FIG. 24 is a diagram illustrating a lens which is a twelfth embodiment of the invention in a short focal length condition.
Figure 25:
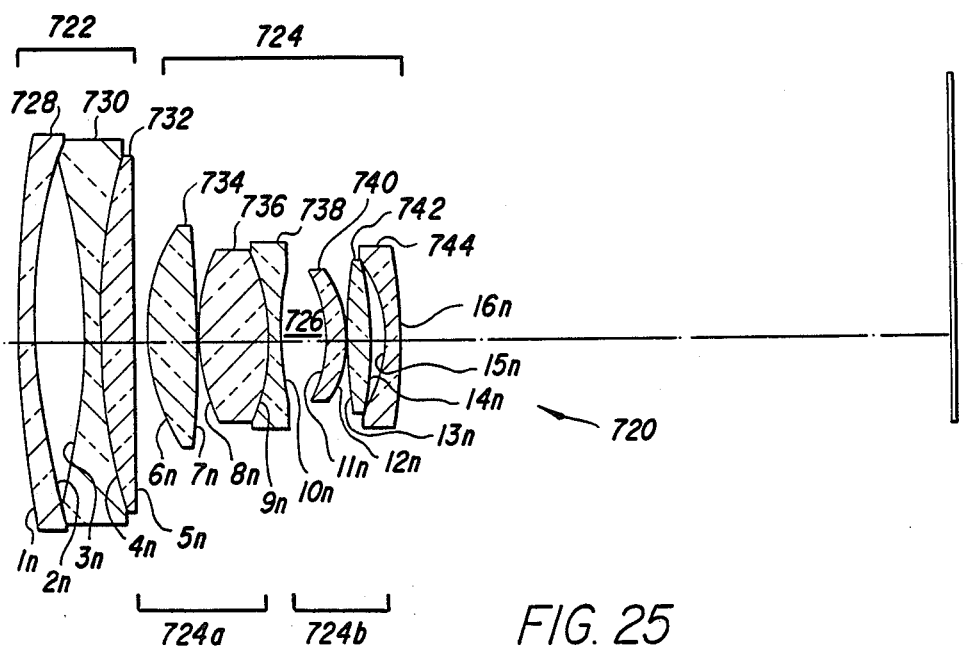
FIG. 25 is a diagram of the lens illustrated in FIG. 23 but in a long focal length condition.

A twelfth illustrative embodiment of the invention is illustrated in FIGS. 23 and 24 in the form of a zoom lens 720 with a zoom range of 36.5 to 67.5. The lens 720 includes a first lens element unit 722 and a second lens unit 724 comprising sub-units 724a and 724b. The forward lens element unit 722 moves for focusing and for compensating during zooming, the second variator lens unit 724 moves for zooming and the two lens element sub-units 724a and 724b also move relative to each other during zooming, thereby changing the large air space 726 between the sub-units.

The forward lens element unit 722 is negative and includes three elements 728, 730 and 732. Element 728 is a negative meniscus, element 730 is biconcave and element 732 is biconvex, the latter two forming a doublet.

The second unit 724 is positive and includes six elements, namely elements 734, 736 and 738 in sub-unit 724a and elements 740, 742 and 744 in sub-unit 724b. In the first sub-unit which is positive, element 734 is biconvex and biconvex element 736 and biconcave element 738 form a doublet. In the second sub-unit 724b, the forward element 740 is a positive meniscus, the central element 742 is biconvex and the rearward element 744 is a negative meniscus. In this embodiment, the second sub-unit has overall weak-positive power, unlike the other illustrative embodiments in which the corresponding sub-unit is of negative power. It should be recognized that the negative element in this case is very weak, i.e. sub-unit 724b has a focal length of 4386.0 mm, and that such use of a negative power second variator sub-unit is appropriate only for lenses of relatively small zoom ratio, e.g. 2:1 or lower. It should also be noted that the illustrative embodiments 11 and 12 are similar both in design and also in zoom range, the former being intended to minimize the storage condition length of the lens and the latter to minimize the maximum lens length.

Various constructional parameters of the lens at its short focal length extreme are given in Table 23 below:

TABLE 23

| SURFACE NO. | RADIUS | THICKNESS | REFRACTIVE INDEX d | Abbe V NUMBER | CLEAR APERTURE |
|---|---|---|---|---|---|
| 1n | 98.75 | 1.5 | 1.80518 | 25.5 | 29.11 |
| 2n | 48.42 | 3.98 | | | 27.20 |
| 3n | −47.31 | 1.4 | 1.74100 | 52.6 | 27.15 |
| 4n | 55.72 | 2.89 | 1.84666 | 23.8 | 26.03 |
| 5n | −378.06 | 17.37 | | | 25.75 |
| 6n | 15.09 | 4.18 | 1.58913 | 61.3 | 16.18 |
| 7n | −99.8 | 0.1 | | | 15.06 |
| 8n | 16.34 | 5.63 | 1.48749 | 70.4 | 12.67 |
| 9n | −16.34 | 0.99 | 1.80610 | 33.3 | 10.38 |
| 10n | 21.42 | 5.72 | | | 9.63 |
| 11n | −10.78 | 1.72 | 1.50137 | 56.3 | 9.22 |
| 12n | −9.01 | 0.1 | | | 9.71 |
| 13n | 93.40 | 1.75 | 1.69895 | 30.1 | 10.86 |
| 14n | −32.37 | 1.44 | | | 11.23 |
| 15n | −9.15 | 1.0 | 1.48749 | 70.4 | 11.23 |
| 16n | −50.09 | 25.18 | | | 13.07 |

The lengths of the three variable air spaces 726, 746 and 748 are given in Table 24 below for various focal lengths, including the focal length extremes.

TABLE 24

| EFFECTIVE FOCAL LENGTH | AIR SPACE 626 | AIR SPACE 644 | AIR SPACE 646 |
|---|---|---|---|
| 36.52 | 17.37 | 5.72 | 25.18 |
| 47.73 | 8.81 | 4.53 | 33.54 |
| 67.50 | 0.64 | 3.60 | 44.08 |

In Table 25 below, values of various parameters and characteristics are listed in columns for all of the illustrative embodiments designated by the corresponding row numerals 1–12. These parameters and characteristics are as follows:

$F_1$: Absolute value of focal length of first lens unit.

$\phi$: $F_1/F\phi$ where $F\phi$ is the focal length of the objective at the short focal length position.

$PP_1$: Distance from the first principal point of the variator lens element unit at the short focal length condition to the first lens vertex of the variator lens element unit.

$K$: $PP_1/D$ (%) where D is the diagonal of the image plane.

$R_1$: Ratio of the magnification of the first sub-unit at long focal length position to the magnification at the short focal length position.

$R_2$: Ratio of the magnification of the second sub-unit at long focal length position to the magnification at the short focal length position.

$Q$: $R_1/R_2$ $\beta$: Minimum ratio of object size to image size.

TABLE 25

| | $F_1$ | $\phi$ | $PP_1$ | $K$ | $R_1$ | $R_2$ | $Q$ | $\beta$ |
|---|---|---|---|---|---|---|---|---|
| 1 | 57.4 | .51 | 31.1 | 72 | 2.09 | 1.93 | 1.08 | 3.8 |
| 2 | 57.5 | .51 | 33.2 | 77 | 2.00 | 1.94 | 1.03 | 3.8 |
| 3 | 50.1 | .58 | 28.6 | 66 | 1.90 | 1.74 | 1.09 | 3.8 |
| 4 | 57.1 | .51 | 35.3 | 82 | 2.54 | 1.94 | 1.31 | 3.8 |
| 5 | 60.0 | .49 | 37.0 | 86 | 2.06 | 1.93 | 1.07 | 3.8 |
| 6 | 57.5 | .51 | 32.5 | 75 | 2.40 | 1.93 | 1.24 | 3.8 |
| 7 | 57.8 | .51 | 31.2 | 72 | 2.64 | 2.01 | 1.31 | 3.8 |
| 8 | 57.5 | .51 | 31.3 | 72 | 2.03 | 1.93 | 1.05 | 3.8 |
| 9 | 63.8 | .57 | 18.7 | 43 | 2.30 | 1.38 | 1.66 | 3.8 |
| 10 | 65.3 | .56 | 17.9 | 41 | 2.47 | 1.32 | 1.87 | 3.8 |
| 11 | 25.7 | 1.42 | 6.2 | 14 | 1.51 | 1.40 | 1.20 | 7.0 |
| 12 | 49.8 | .73 | 8.1 | 19 | 1.85 | 1.00 | 1.86 | 7.0 |

It will be observed that all of the described embodiments of the invention have a short focal length which is less than the diagonal measurement, 43.27 mm., of a 35 mm. photographic image. Also, because all of the focusing is accomplished by the first lens element unit in all of the embodiments, the image remains in focus for all object distances.

In the illustrative embodiments of the invention described above, all of the lens elements are spherical. It is to be understood, however, that one or more aspheric surfaces may be used in embodiments of the present invention and the invention is to be understood as including embodiments in which an aspheric surface or aspheric surfaces are used. Also, it should be obvious that weak optical components which do not significantly alter third order aberration corrections or the like might also be employed, but the term "element" is not intended to include such components for purposes of the present application.

The invention has been described in detail with particular reference to presently preferred embodiments, but it will be understood that variations and modifications can be effected within the spirit and scope of the invention.

We claim:

1. A wide-angle zoom lens comprising:
 a movable negative power focusing and compensating lens element unit located at the front of said lens; and
 a positive power variator lens element unit located behind said focusing and compensating lens element unit, said variator lens element unit comprising:
 a forward movable positive power lens element sub-unit including a plurality of mutually adjacent positive power lens elements, and at least one negative power lens element located at the rearward end of said positive power lens sub-unit; and
 a rearward movable negative power lens element sub-unit.

2. The invention defined by claim 1 in which the negative power lens element sub-unit comprises at least one positive power lens element followed by at least one negative power lens element.

3. The invention defined by claim 1 in which the first principal point of the positive power lens element sub-unit is located in front of its first lens vertex.

4. The invention defined by claim 1 in which the ratio of magnification change during zooming of the positive power lens element sub-unit to that of the negative power lens element sub-unit lies in the range of 1.03 to 1.87.

5. The invention defined by claim 1 in which the image diagonal covered by the lens at its shortest focal length position is greater than the focal length of the lens at that position.

6. The invention defined by claim 1 in which the lens element sub-units of the variator lens element unit move independently of each other.

7. The invention defined by claim 1 including an additional lens element unit of substantially constant magnification during zooming located rearwardly at the variating lens element unit.

8. The invention defined by claim 1 in which the power of the negative power focusing and compensating lens element unit satisfies the relationship $$x_i < \phi_i < x_2$$

where $\phi_i$ is the absolute power of the focusing and compensating lens element unit when the focal length for the short focal length zoom position is scaled to unity, and $x_i$ and $x_2$ are 0.51 and 1.42 respectively.

9. The invention defined by claim 1 in which, for any object distance, the image distance remains constant throughout the entire zoom range.

10. The invention defined by claim 1 in which said zoom lens is capable of providing object-to-image magnification of at least 4:1 when the variator lens element unit is at the longest focal length position.

11. A wide-angle zoom lens comprising:
 a movable negative power focusing and compensating lens element unit located at the front of said lens and including at least two negative power lens elements, and
 a positive power variator lens element unit comprising a forward movable positive power lens element sub-unit and a rearward movable negative power lens element sub-unit, said variator lens element unit having its first principal point located forwardly of its foremost vertex by a distance greater than 10% of the diagonal of the image surface.

12. The invention defined by claim 11 in which the negative power lens element sub-unit comprises at least one positive power lens element followed by at least one negative power lens element.

13. The invention defined by claim 11 in which the first principal point of the positive power lens element sub-unit is located in front of its first lens vertex.

14. The invention defined by claim 11 in which the image diagonal covered by the lens at its shortest focal length position is greater than the focal length of the lens at that position.

15. The invention defined by claim 11 in which the lens element sub-units of the variator lens element unit move independently of each other.

16. The invention defined by claim 11 in which the sum of the air-spaces of the negative power focusing and compensating lens element unit includes air-spaced lens elements, the spacing between such elements exceeding the sum of the thicknesses of the lens elements of that lens element unit.

17. The invention defined by claim 11 in which the absolute power of the negative power focusing and compensating lens element unit satisfies the relationship $$x_i < \phi_i < x_2$$

where $\phi_i$ is the power of the focusing and compensating lens element unit when the focal length for the short focal length zoom position is scaled to unit, and $x_i$ and $x_2$ are 0.51 and 1.42 respectively.

18. The invention defined by claim 11 in which, for any object distance, the image distance remains constant throughout the entire zoom range.

19. The invention defined by claim 11 in which said zoom lens is capable of providing object-to-image magnification of at least 4:1 when the variator lens element unit is at the longest focal length position.

20. A wide-angle zoom lens comprising:
 a movable negative power focusing and compensating lens element unit at the front of said lens; and
 a variator lens element unit rearwardly of said focusing and compensating lens element unit, said variator lens element unit comprising,
 a forward movable positive power lens element sub-unit which provides the majority of magnification change during zooming and
 a rearward negative power lens element sub-unit including at least one positive power lens element fowardly of at least one negative power lens element located at the rearward end of said negative power lens element sub-unit.

21. The invention defined by claim 20 in which the negative power lens element sub-unit comprises at least one positive power lens element followed by at least one negative power lens element.

22. The invention defined by claim 20 in which the first principal point of the positive power lens element sub-unit is located in front of its first lens vertex.

23. The invention defined by claim 20 in which the ratio of magnification change during zooming of the positive power lens element sub-unit to that of the negative power lens element sub-unit lies in the range of 1.03 to 1.87.

24. The invention defined by claim 20 in which the image diagonal is longer than the focal length of the lens at its shortest focal length position.

25. The invention defined by claim 20 in which the lens element sub-units of the variator lens element unit move independently of each other.

26. The invention defined by claim 20 including an additional lens element unit of substantially constant magnification during zooming located rearwardly at the variating lens element unit.

27. The invention defined by claim 20 in which the absolute power of the negative power focusing and compensating lens element unit satisfies the relationship $$x_i < \phi_i < x_2$$

where $\phi_i$ is the power of the focusing and compensating lens element unit when the focal length for the short focal length zoom position is scaled to unity, and $x_i$ and $x_2$ are 0.51 and 1.42 respectively.

28. The invention defined by claim 20 in which, for any object distance, the image distance remains constant throughout the entire zoom range.

29. The invention defined by claim 20 in which said zoom lens is capable of providing object-to-image magnification of at least 4:1 when the variator lens element unit is at the longest focal length position.

30. A wide-angle macro-focus zoom lens comprising:
a movable negative power focusing and compensating lens element unit located at the front of said lens and including at least two negative power lens elements;
a positive power variator lens element unit comprising a forward movable positive power lens element sub-unit which provides the majority of magnification change during zooming and a rearward movable negative power lens element sub-unit, said variator lens element unit having its first principal point located forwardly of its forward vertex by a distance equal to at least 10% of the diagonal of the image plane.

* * * * *

UNITED STATES PATENT OFFICE
CERTIFICATE OF CORRECTION

PATENT NO. : 4,828,372
DATED : May 9, 1989
INVENTOR(S) : E. Betensky and M. Kreitzer It is certified that error appears in the above-identified patent and that said Letters Patent is hereby corrected as shown below:

Column 16, Table 15, last number in column headed "Radius"      "60.92" should read -- -60.92 --

Column 24, line 48     "unit" should read --unity--

Signed and Sealed this

Twentieth Day of February, 1990

*Attest:*

JEFFREY M. SAMUELS

*Attesting Officer*     *Acting Commissioner of Patents and Trademarks*